US011864049B2

(12) United States Patent
Park et al.

(10) Patent No.: US 11,864,049 B2
(45) Date of Patent: *Jan. 2, 2024

(54) RADIO LINK FAILURE REPORTING BASED ON A FAILURE OF A BEAM FAILURE RECOVERY PROCEDURE

(71) Applicant: ResMed Inc., San Diego, CA (US)

(72) Inventors: Kyungmin Park, Vienna, VA (US); Esmael Dinan, McLean, VA (US); Hyoungsuk Jeon, Centreville, VA (US); Hua Zhou, Herndon, VA (US); Alireza Babaei, Fairfax, VA (US); Ali Cagatay Cirik, Herndon, VA (US)

(73) Assignee: ResMed Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,421

(22) Filed: Sep. 3, 2021

(65) Prior Publication Data

US 2021/0400555 A1    Dec. 23, 2021

Related U.S. Application Data

(63) Continuation of application No. 16/277,062, filed on Feb. 15, 2019, now Pat. No. 11,115,892.

(Continued)

(51) Int. Cl.
*H04W 36/00* (2009.01)
*H04W 36/30* (2009.01)
(Continued)

(52) U.S. Cl.
CPC ......... *H04W 36/305* (2018.08); *H04W 24/10* (2013.01); *H04W 36/0077* (2013.01); *H04W 36/14* (2013.01)

(58) Field of Classification Search
CPC ............... H04W 36/305; H04W 24/10; H04W 36/0077; H04W 36/14; H04W 36/06;
(Continued)

(56) References Cited

U.S. PATENT DOCUMENTS 10,009,952 B2 *   6/2018  Kim ..................... H04L 5/0073
2016/0183234 A1   6/2016  Sung et al.
(Continued)

FOREIGN PATENT DOCUMENTS

WO    2018136300 A1    7/2018

OTHER PUBLICATIONS

R2-1800086; 3GPP TSG-RAN2 AH-1801; Vancouver, Canada, Jan. 22-Jan. 26, 2018; Agenda item:10.3.1.4.2; Source:Samsung; Title:Issues/Corrections: Beam Failure Recovery Request Procedure; Document for: Discussion & Decision.

(Continued)

*Primary Examiner* — John D Blanton
(74) *Attorney, Agent, or Firm* — Patterson + Sheridan, LLP

(57) ABSTRACT

A wireless device initiates a beam failure recovery procedure based on a beam failure of at least one beam of a cell. A radio link failure is determined based on a failure of the beam failure recovery procedure. A radio link failure report is transmitted. The radio link failure report comprises: a first field indicating that the failure of the beam failure recovery procedure is a cause of the radio link failure; and a second field indicating a random access resource for the beam failure recovery procedure.

20 Claims, 30 Drawing Sheets

Related U.S. Application Data

(60) Provisional application No. 62/631,234, filed on Feb. 15, 2018.

(51) Int. Cl.
*H04W 24/10* (2009.01)
*H04W 36/14* (2009.01)

(58) Field of Classification Search
CPC ..... H04W 76/38; H04W 76/19; H04W 24/04; H04B 7/0617; H04B 7/0695
See application file for complete search history.

(56) References Cited

U.S. PATENT DOCUMENTS

| | | | |
|---|---|---|---|
| 2017/0171784 A1 | 6/2017 | Mitsui et al. | |
| 2017/0251409 A1* | 8/2017 | Wegmann | H04W 24/02 |
| 2018/0227805 A1* | 8/2018 | Jang | H04W 28/26 |
| 2018/0242340 A1* | 8/2018 | Pu | H04W 74/0816 |
| 2018/0279284 A1* | 9/2018 | Wang | H04W 24/10 |
| 2018/0288756 A1* | 10/2018 | Xia | H04W 74/006 |
| 2019/0098520 A1* | 3/2019 | Kim | H04B 7/0404 |
| 2019/0150010 A1* | 5/2019 | Kwon | H04W 24/10 370/252 |
| 2019/0280756 A1 | 9/2019 | Fan et al. | |
| 2020/0092785 A1* | 3/2020 | Yang | H04W 36/06 |
| 2020/0099437 A1* | 3/2020 | Harada | H04W 74/0833 |
| 2020/0127883 A1* | 4/2020 | Liu | H04L 41/0686 |
| 2020/0322813 A1 | 10/2020 | Jia et al. | |

OTHER PUBLICATIONS

R2-1800095; 3GPP TSG-RAN WG2 AH-1801; Vancouver, Canada, Jan. 22-Jan. 26, 2018;Change Request; 38.321 CR TBD; Current Version: 15.0.0; Title: Corrections for Beam Failure Recovery Request Procedure; Source to WG: Samsung Electronics; Source to TSG: R2; Work item code: NR_newRAT-Core; Date: Jan. 11, 2018.
R2-1800146; 3GPP TSG-RAN WG2 NR Ad hoc 0118; Vancouver, Canada, Jan. 22-Jan. 26, 2018; Title: [Draft] Reply LS to RAN1 on beam recovery failure; Response to:-; Release:Rel-15; Work Item: NR_newRAT-Core; Source: CATT [to be RAN2].
R2-1800160; 3GPP TSG-RAN WG2 NR Ad hoc 0118; Vancouver, Canada, Jan. 22-Jan. 26, 2018; Source:CATT; Title:BWP for Beam Failure Recovery; Agenda Item:10.3.1.4.2; Document for: Discussion and Decision.
R2-1800206; 3GPP TSG-RAN WG2 Ad Hoc; Vancouver, Canada,Jan. 22-Jan. 26, 2018; Resubmission of R2-1712734; Agenda item:10.3.2.3; Source: Huawei, HiSilicon; Title: Further consideration on RLF indication; Document for: Discussion.
R2-1800236; 3GPP TSG RAN 2 NR AH 1801; Vancouver, Canada, Jan. 22-26, 2018; Agenda Item:10.2.8; Source: Xiaomi; Title: Random access failure consideration for SUL; Document for: Discussion and Decision.
R2-1800274; 3GPP TSG-RAN WG NR Ad hoc 0118; Vancouver, Canada, Jan. 22-Jan. 26, 2018; Agenda item:10.2.8; Source:Spreadtrum Communications; Title:Discussions on the IS and OOS counting procedure; Document for: Discussion.
R2-1800314; 3GPP TSG-RAN WG2 NR Ad hoc 1801; Vancouver, Canada, Jan. 22-Jan. 26, 2018 ; Agenda Item:10.2.8; Source: Fujitsu; Title:Link reconfiguration and RLM/RLF; Document for:Decision.
R2-1800513; 3GPP TSG-RAN WG2#AH-1801; Vancouver, Canada, Jan. 22-26, 2018; Source: Huawei, HiSilicon; Title: RLF with beam failure recovery; Agenda Item:10.2.8; Document for: Discussion and decision.
R2-1800592;3GPP TSG-RAN WG2 NR AH#3Tdoc; Vancouver, Canada, Jan. 22-26, 2018 (Update of R2-1713588); Agenda Item:10.2.8 Mobility-RLM,RLF; Source:Ericsson; Title:Beam recovery impact to RLF triggering; Document for: Discussion, Decision.
R2-1800632; 3GPP TSG-RAN WG2 Ad Hoc; Vancouver, Canada, Jan. 22-Jan. 26, 2018; Agenda item: 10.2.2.1; Source: Huawei, HiSilicon; Title: Remaining issue for beam failure recovery; Document for: Discussion.
R2-1800646; 3GPP TSG-RAN WG2 Meeting AH-1801; Vancouver, Canada, Jan. 22-26, 2018(Revision of R2-1710881); Agenda Item:10.2.8; Source:MediaTek Inc., Qualcomm Incorporated; Title: RLM/RLF Considering Beam Failure Recovery; Document for: Discussion and decision.
R2-1800652; 3GPP TSG-RAN WG2 Meeting AH-1801; Vancouver, Canada, Jan. 22-26, 2018; Agenda Item:10.3.1.4.2; Souce:MediaTek Inc.; Title:Further Clarification on Beam Failure Recovery Procedure; Document for: Discussion and Decision.
R2-1800660; Draft CR for Beam Failure Recovery Procedure; 3GPP TSG-RAN WG2 Meeting AH-1801; Vancouver, Canada, Jan. 22-26, 2018; CR-Form-v11.2; Change Request; 38.321; Title: Draft CR for beam failure recovery procedure; Source to WG: Mediatek Inc.; Source to TSG: R2; Work item code: NR_newRAT-Core.
R2-1800780; 3GPP TSG-RAN WG2 Meeting NR AH 1801; Vancouver, Canada, Jan. 22-26, 2018; Agenda item:10.3.1.4.3; Source:Lenovo, Motorola Mobility; Title: Prioritized random access for beam failure recovery; Document for: Discussion and Decision.
R2-1800865; 3GPP TSG-RAN WG2 NR Ad hoc 1801; Vancouver, Canada, Jan. 22-26, 2018(Revision of R2-1712753); Source:vivo; Title:RLM / RLF in NR; Agenda Item:10.2.8;Document for: Discussion and Decision.
R2-1800866; 3GPP TSG-RAN WG2 NR Ad hoc 1801; Vancouver, Canada, Jan. 22-26, 2018(Resubmission of R2-1712754); Source:vivo; Title:RACH configuration for beam recovery; Agenda Item:10.3.1.4.2; Document for: Discussion and Decision.
R2-1800867; 3GPP TSG-RAN WG2 NR Ad hoc 1801; Vancouver, Canada, Jan. 22-26, 2018; Source:vivo; Title:Clarification on beam failure recovery and text proposal; Agenda Item:10.3.1.4.3; Document for: Discussion and Decision.
R2-1800887; 3GPP TSG-RAN WG2 Meeting #100; Reno, USA, Nov. 27-Dec. 1, 2017; Source:vivo; Title:Clarification on the measurement used for the beam selection; Agenda Item:10.3.1.4.2; Document for: Discussion and Decision.
R2-1800895; 3GPP TSG-RAN WG2 NR Ad hoc 1801; Vancouver, Canada, Jan. 22-26, 2018; Source:vivo; Title:Discussion on the impact on beam failure recovery; Agenda Item:10.3.1.4.3; Document for: Discussion and Decision.
R2-1800963; 3GPP TSG-RAN WG2 NR Ad hoc 1801; Vancouver, Canada, Jan. 22-26, 2018; Agenda item:10.3.1.4.2; Source:Nokia, Nokia Shanghai Bell; Title: Clarifications to beam recovery procedure; WID/SID: NR_newRAT-Core—Release 15; Document for: Discussion and Decision.
R2-1800964; Draft CR to 38.321 on Beam recovery procedure; 3GPP TSG-RAN WG2 NR Ad hoc 1801;Vancouver, Canada, Jan. 22-26, 2018; CR-Form-v11.2; Draft Change Request; Title: Beam recovery procedure; Source to WG: Nokia, Nokia Shanghai Bell; Source to TSG: RAN WG2; Work item code: NR_newRAT-Core.
R2-1800974; 3GPP TSG-RAN WG2 NR Ad hoc 0118; Vancouver, Canada, Jan. 22-Jan. 26, 2018; Agenda item:10.3.1.5; Source:Huawei, HiSilicon; Title:On SR procedure in the case of beam failure; Document for: Discussion and Decision.
R2-1800992; 3GPP TSG-RAN WG2#AH-1801; Vancouver, Canada, Jan. 22-26, 2018; CR-Form-v11.1; Change Request; Title: Correction for beam failure recovery response reception; Source to WG: Huawei, HiSilicon; Source to TSG: R2; Work item code: NR_newRAT-Core.
R2-1800993; 3GPP TSG-RAN2 Meeting #AH; Vancouver, Canada, Jan. 22-26, 2018; Agenda Item:10.3.1.4.2; Source: Huawei, HiSilicon; Title: Remaining issues in RA with multi-beam operations; Document for: Discussion and decision.
R2-1800994; 3GPP TSG-RAN WG2 Meeting #AH1801; Vancouver, Canada, Jan. 22-26, 2018; CR-Form-v11.1; Change Request-;Title: Corrections for RA procedure with multi-beam operation; Source to WG: Huawei, HiSilicon; Source to TSG: R2.
R2-1801009; 3GPP TSG-RAN2 Meeting #AH-1801; Vancouver, Canada, Jan. 22-26, 2018; Agenda Item:10.3.1.4.3; Source: Huawei, HiSilicon; Title: General consideration on RA procedure for beam failure recovery; Document for:Discussion and decision.

(56) References Cited

OTHER PUBLICATIONS

R2-1801027; 3GPP TSG-RAN WG2 NR Ad hoc 1801; Vancouver, Canada, Jan. 22-26, 2018; Agenda item:10.2.8.; Source:Nokia, Nokia Shanghai Bell; Title: Impact of Beam Failure Recovery on RLF related actions; WID/ SID: NR_newRAT-Core—Release 15; Document for: Discussion and Decision.
R2-1801028; 3GPP TSG-RAN WG2 NR Ad hoc 1801; Vancouver, Canada, Jan. 22-26, 2018; CR-Form-v11.2; Draft Change Request-;Title: CR for impact of Beam Failure Recovery on RLF related actions; Source to WG: Nokia, Nokia Shanghai Bell; Source to TSG: R2; Work item code: NR_newRAT-Core.
R2-1801049; 3GPP TSG-RAN WG2#AH-1801; Vancouver, Canada, Jan. 22-26, 2018; Source: Huawei, HiSilicon; Title: non-contention based random access for beam failure recovery in CA; Agenda Item:10.3.1.4.3; Document for: Discussion and decision.
R2-1801050; 3GPP TSG-RAN WG2#AH-1801; Vancouver, Canada, Jan. 22-26, 2018; CR-Form-v11.1; Change Request; Title: CR on non-contention based random access for beam failure recovery; Source to WG: Huawei, HiSilicon; Source to TSG: R2; Work item code: NR_newRAT-Core.
R2-1801215; 3GPP TSG-RAN WG2 NR Ad hoc 1801;Vancouver, Canada, Jan. 22-Jan. 26, 2018; Source: AT&T; Title:Impact of beam failure and recovery on RLM procedures; Agenda Item:10.2.8; Document for: Discussion.
R2-1801255; 3GPP TSG-RAN WG2 Meeting Ad-hoc; Vancouver, Canada, Jan. 22-26, 2018 (Revision of R2-1711350); Agenda item:10. 3.1.4.2; Source:Qualcomm Incorporated; Title:Measurement reporting and beam refinement during RACH; WID/SID: NR_newRAT-Core—Release 15; Document for: Discussion and Decision.
R2-1801269; 3GPP TSG-RAN WG2 Meeting #100R2-1801269 ; Vancouver, Canada, Jan. 22-26, 2018 (Resubmission of R2-1713894); Agenda item:10.3.1.4.2; Source:Qualcomm Incorporated; Title:Beam refinement after beam recovery or scheduling request; WID/SID: NR_newRAT-Core—Release 15; Document for: Discussion and Decision.
R2-1801278; 3GPP TSG-RAN WG2 Meeting #100; Vancouver, Canada, Jan. 22-26, 2018; Agenda item:10.4.1.4.1; Source:Qualcomm Incorporated; Title:Value range of RLF timer; WID/SID: NR_newRAT-Core—Release 15; Document for: Discussion and Decision.
R2-1801300; 3GPP TSG-RAN WG2 NR Ad Hoc;Vancouver, Canada, Jan. 22-26, 2018 Revision of R2-1711417; Agenda Item: 10.2.8; Source: LG Electronics Inc.; Title:RLF considering Beam Recovery Failure; Document for : Discussion and Decision.
R2-1801404; 3GPP TSG-RAN WG2 NR Ad hoc 1801; Vancouver, Canada, Jan. 22-Jan. 26, 2018; Source:NTT Docomo, Inc. ; Title:Discussion on Beam failure recovery; Document for:Discussion and decisions; Agenda Item: 10.3.1.4.3.
R2-1801405; CR to 38.321 on Clarification on beam failure recovery_r1; 3GPP TSG-RAN WG2 NR Ad hoc 1801R2-1801405; Vancouver, Canada, Jan. 22-Jan. 26, 2018; CR-Form-v11.2; Change Request.
R2-1801413; 3GPP TSG-RAN WG2 2018 RAN2 Ad-hoc Meeting R2-1801413; Vancouver, Canada, Jan. 21-25, 2018(Revison of R2-1713792); Agenda item:10.2.8; Source:Samsung; Title: Regarding aperiodic indications from beam failure recovery to assist RLF; Document for: Discussion & Decision.
R2-1801443; 3GPP TSG-RAN WG2 Meeting NR ad-hoc #1R2-1801443; Vancouver, Canada, Jan. 22-26, 2018; CR-Form-v11.2; Change Request;Title: CR on random access resource selection for beam failure recovery; Source to WG: Qualcomm Incorporated; Source to TSG: R2; Work item code: NR_newRAT-Core.
R2-1801476; 3GPP TSG-RAN WG2 NR Ad hoc 1801R2-1801476; Vancouver, Canada, Jan. 22-Jan. 26, 2018; Agenda Item: 10.3.1.4.2 (NR_newRAT-Core); Source: LG Electronics Inc.; Title : MAC and PHY operation for beam failure recovery request; Document for : Discussion and Decision.
R2-1800255; 3GPP TSG-RAN WG2 NR Ad hoc 0118; Vancouver, Canada, Jan. 22-Jan. 26, 2018; Change Request; 38.300 CR-Rev-Current Version: 15.0.0; Title: CR on the random access principles in TS 38.300; Source to WG: Huawei, HiSilicon; Source to TSG: R2; Work item code: NR_newRAT-Core.
R2-1801513; 3GPP TSG-RAN WG2 NR Ad Hoc; Vancouver, Canada, Jan. 22-26, 2018; Change Request; 38.321; CR 0037 rev—Current version: 15.0.0; Title: Correction to beam failure recovery request parameters; Source to WG: ITL; Source to TSG: RAN2; Work item code: NR_newRAT-Core.
R2-1801477; 3GPP TSG-RAN WG2 NR Ad Hoc #3; Vancouver, Canada, Jan. 22-26, 2018; Change Request; 38.321 CR xxxx rev—Current version: 15.0.0; Title: CR to BFR request in RA procedure; Source to WG: LG Electronics Inc.; Source to TSG: R2; Work item code: NR_newRAT-Core.
3GPP TS 38.321 V15.0.0 (Dec. 2017);Technical Specification 3rd Generation Partnership Project; Technical Specification Group Radio Access Network; NR; Medium Access Control (MAC) protocol specification (Release 15).

* cited by examiner

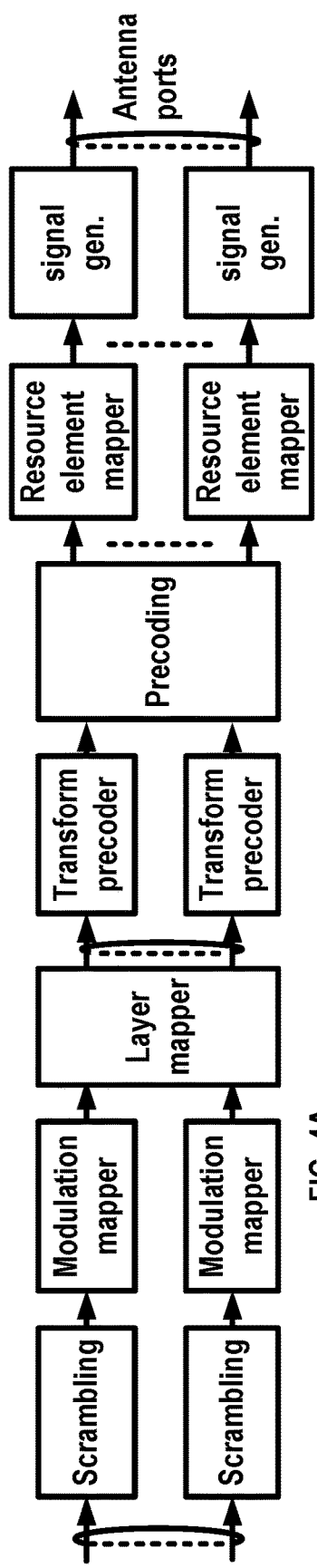
FIG. 4A
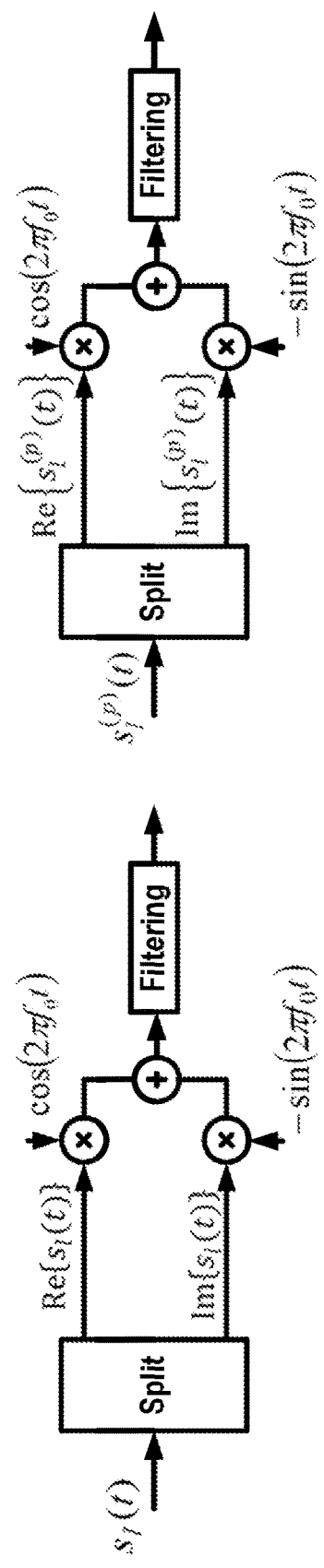
FIG. 4B
FIG. 4D
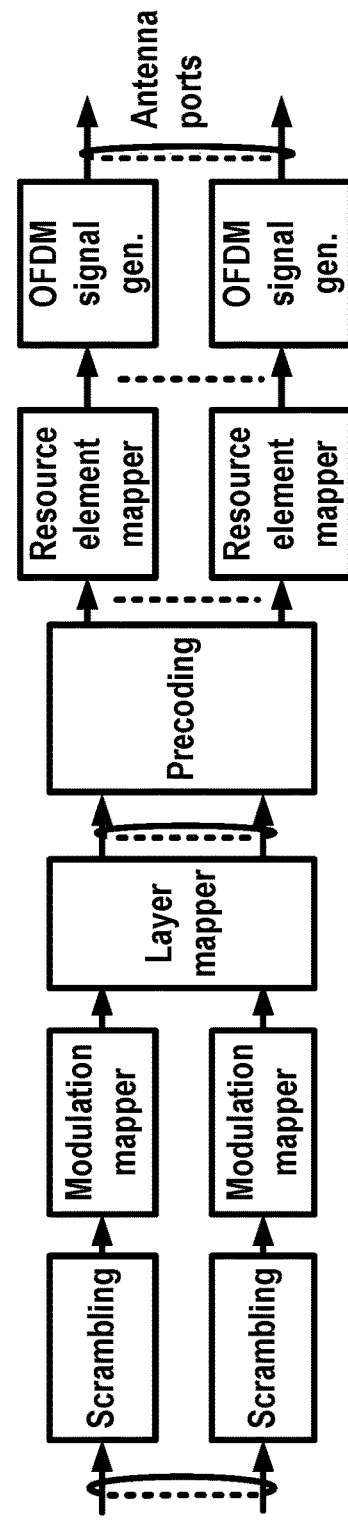
FIG. 4C

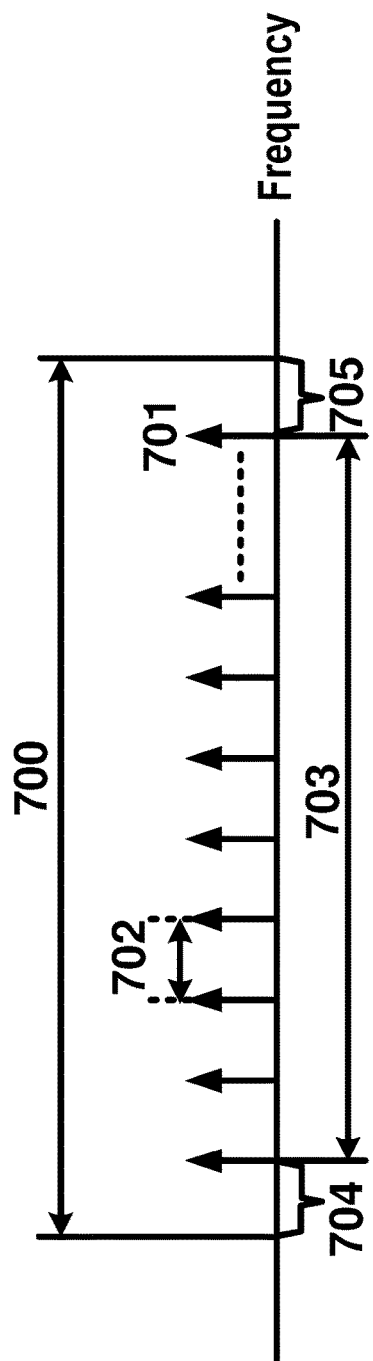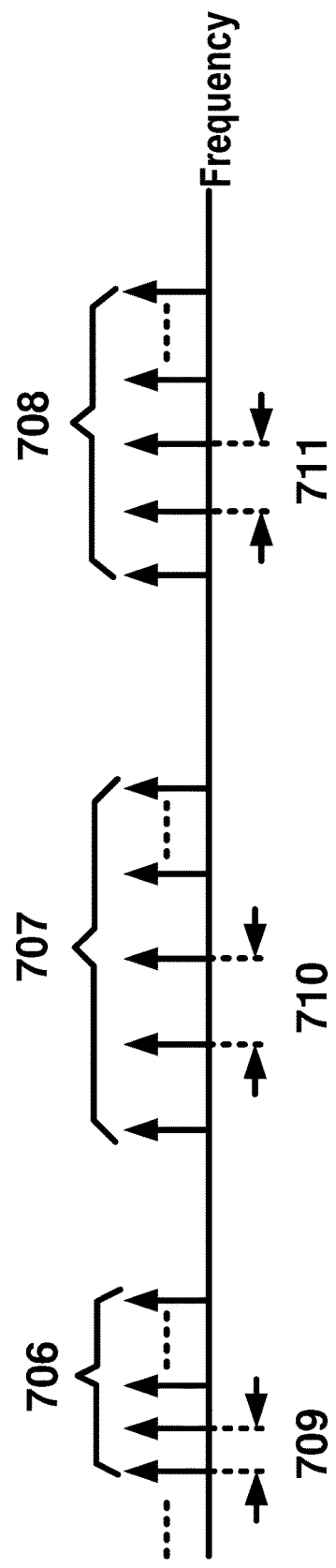
FIG. 7A
FIG. 7B

RADIO LINK FAILURE REPORTING BASED ON A FAILURE OF A BEAM FAILURE RECOVERY PROCEDURE

CROSS-REFERENCE TO RELATED APPLICATIONS

This application is a continuation of U.S. patent Ser. No. 16/277,062, filed Feb. 15, 2019, which claims the benefit of U.S. Provisional Application No. 62/631,234, filed Feb. 15, 2018, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

DETAILED DESCRIPTION OF EMBODIMENTS

Figure 1:
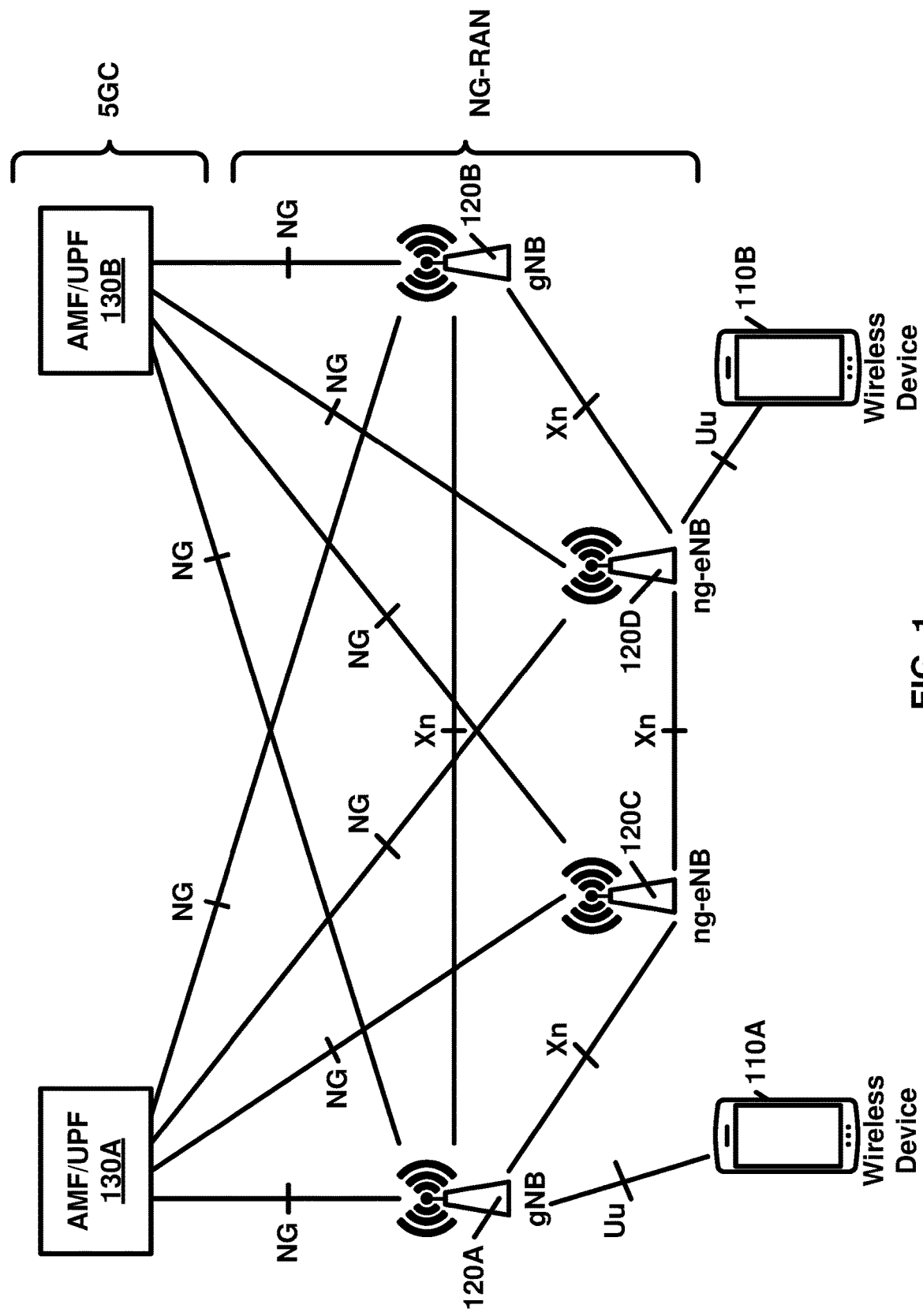
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to wireless communication systems in multicarrier communication systems.

The following Acronyms are used throughout the present disclosure:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
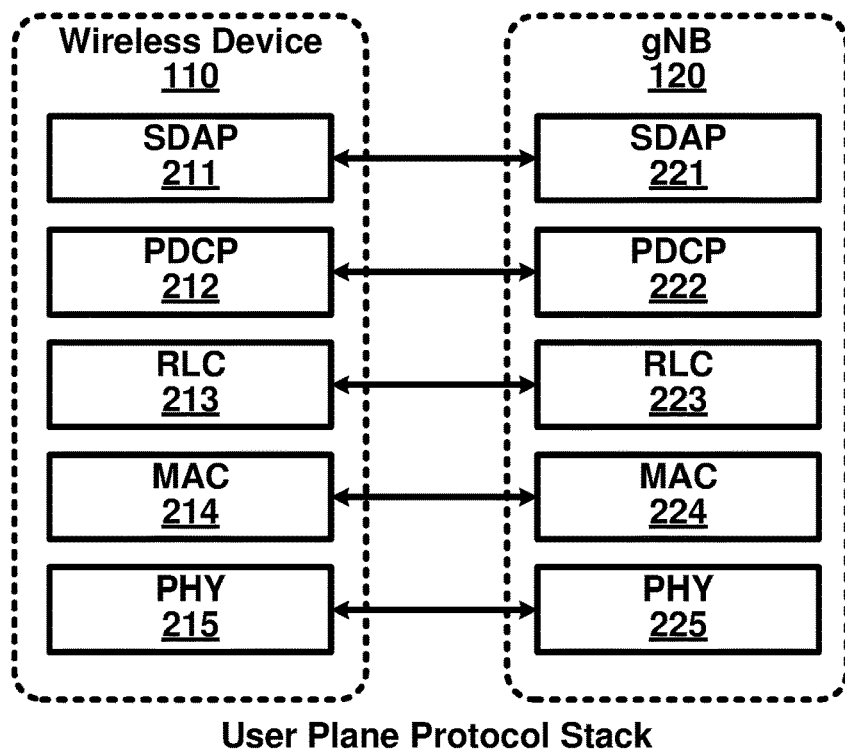
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
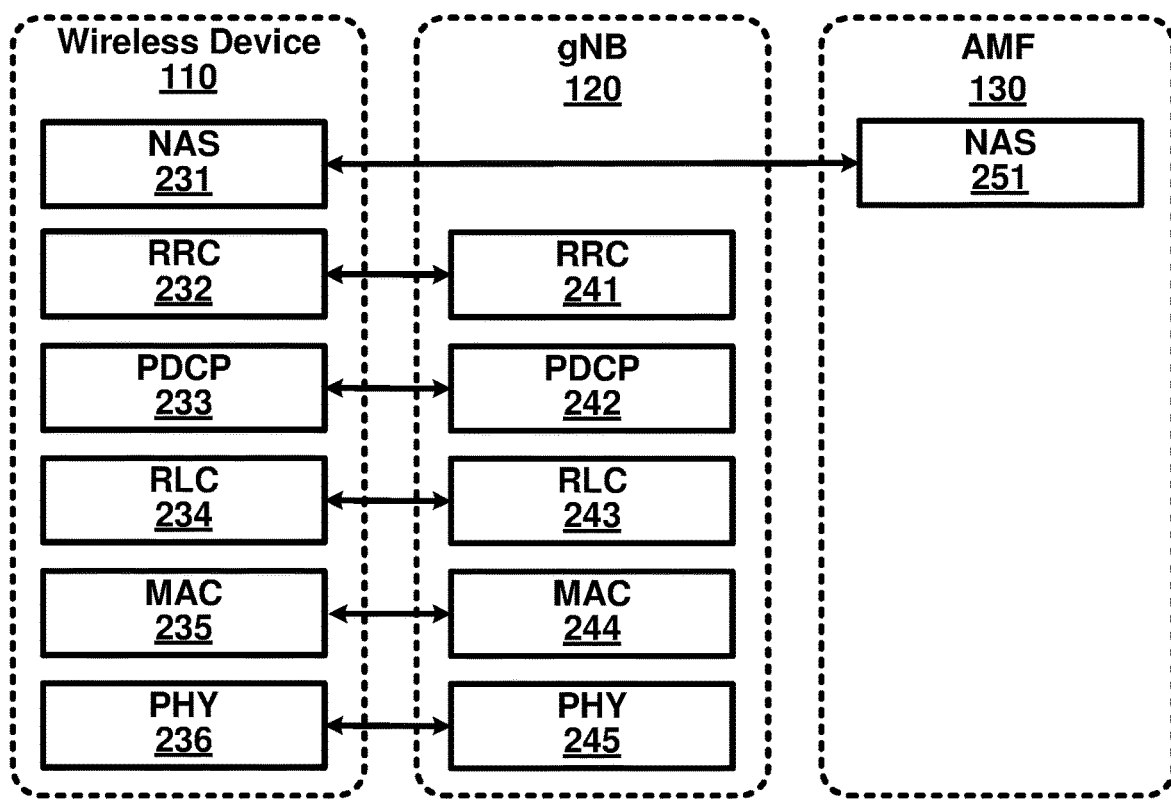
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
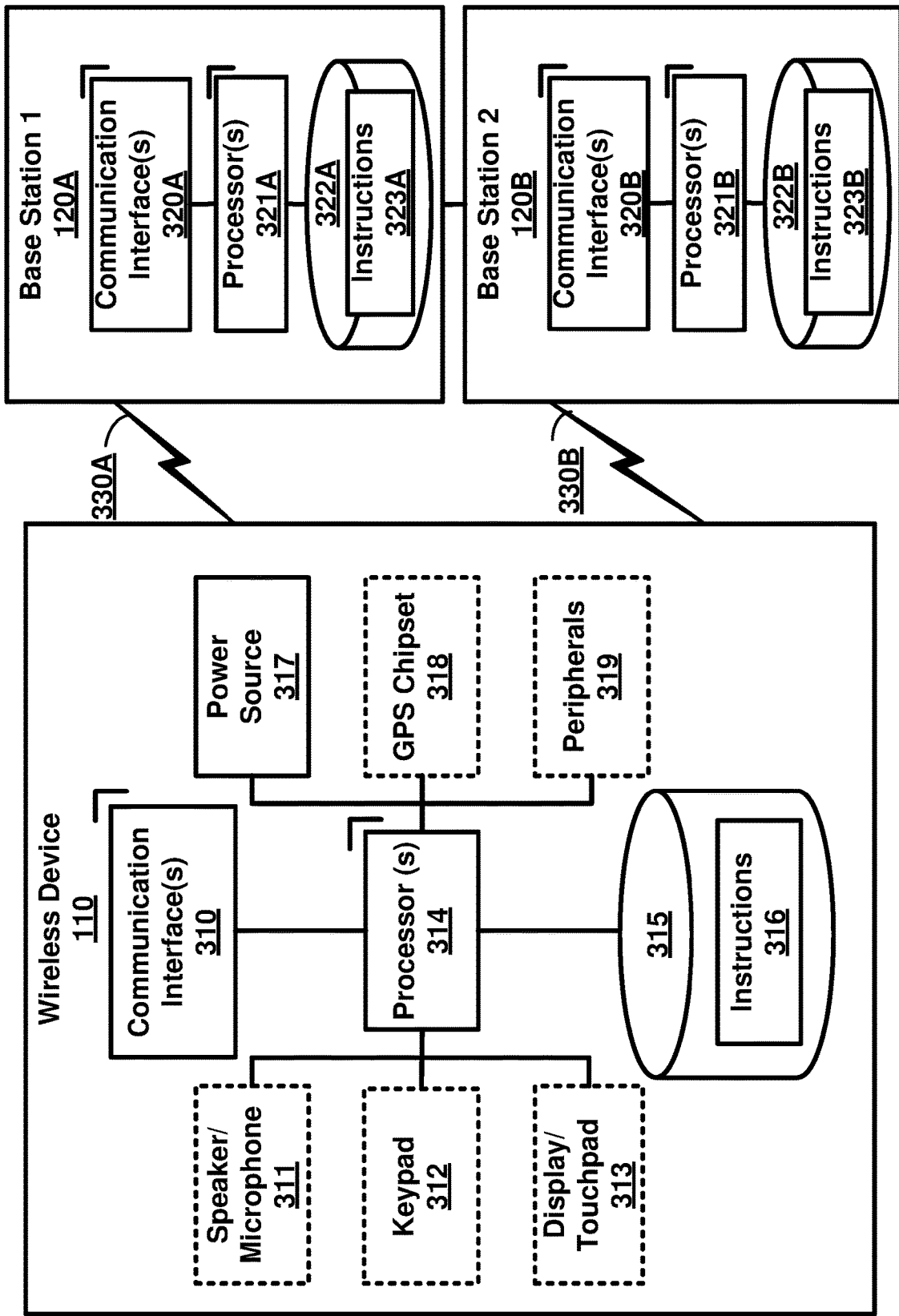
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). An other SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., only static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
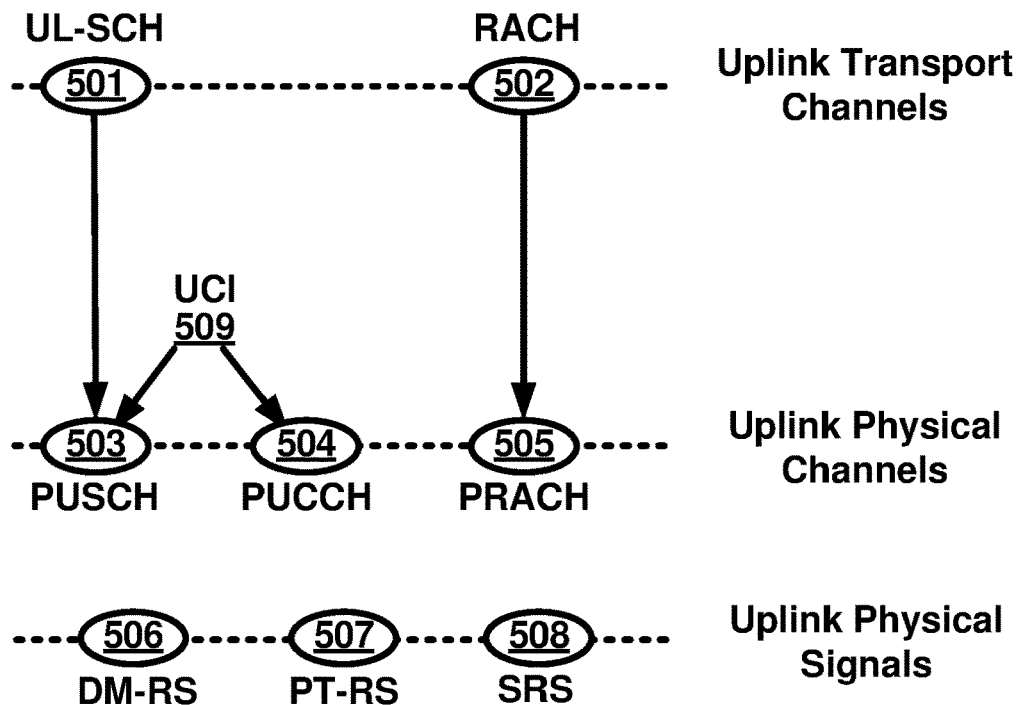
FIG. 5A is a diagram of an example uplink channel mapping and example uplink physical signals as per an aspect of an embodiment of the present disclosure.
Figure 5B:
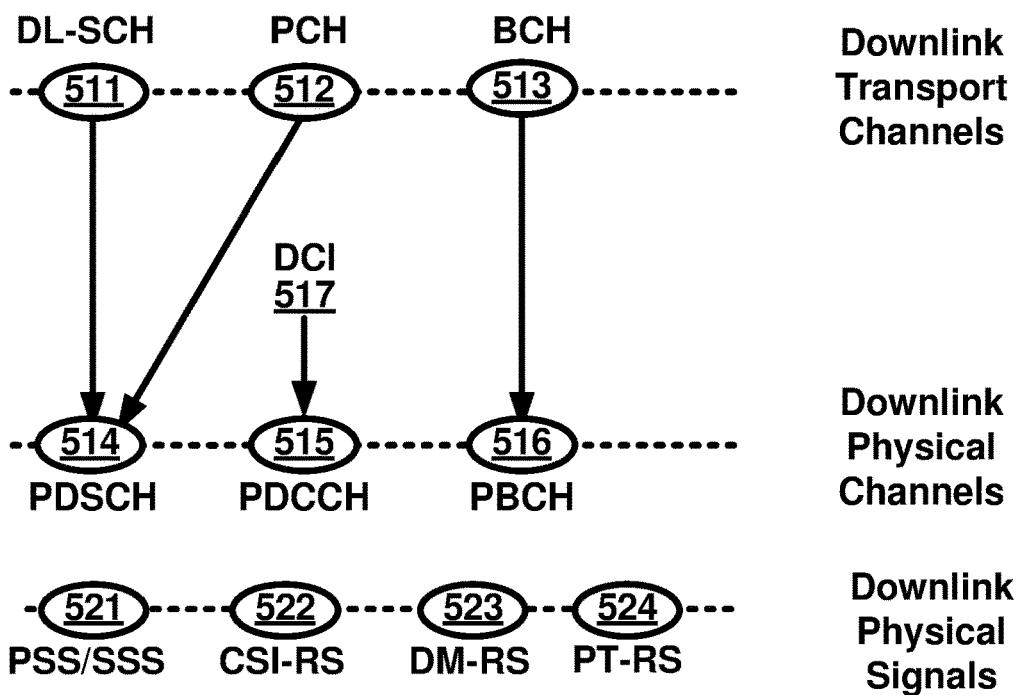
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control Resource Set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
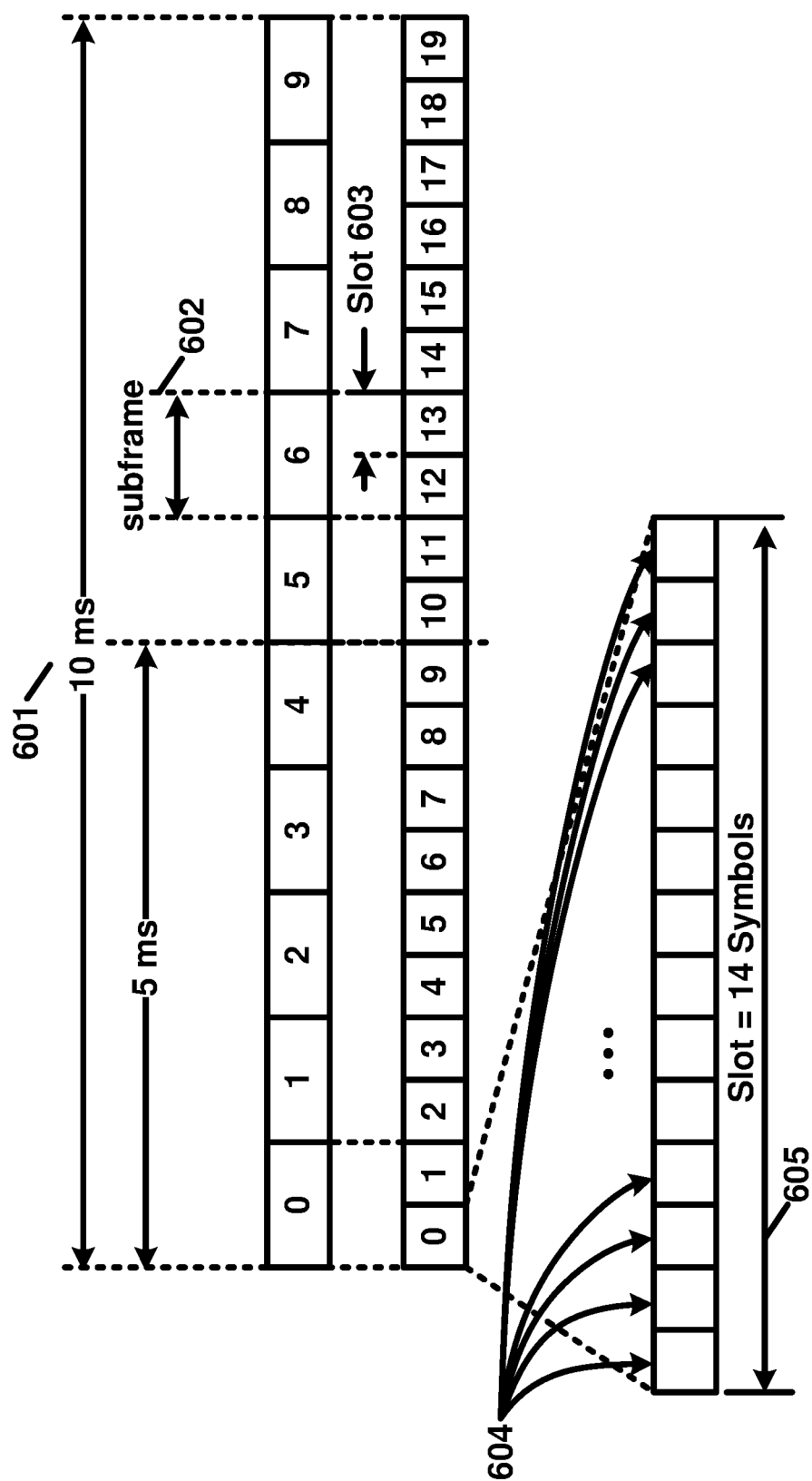
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
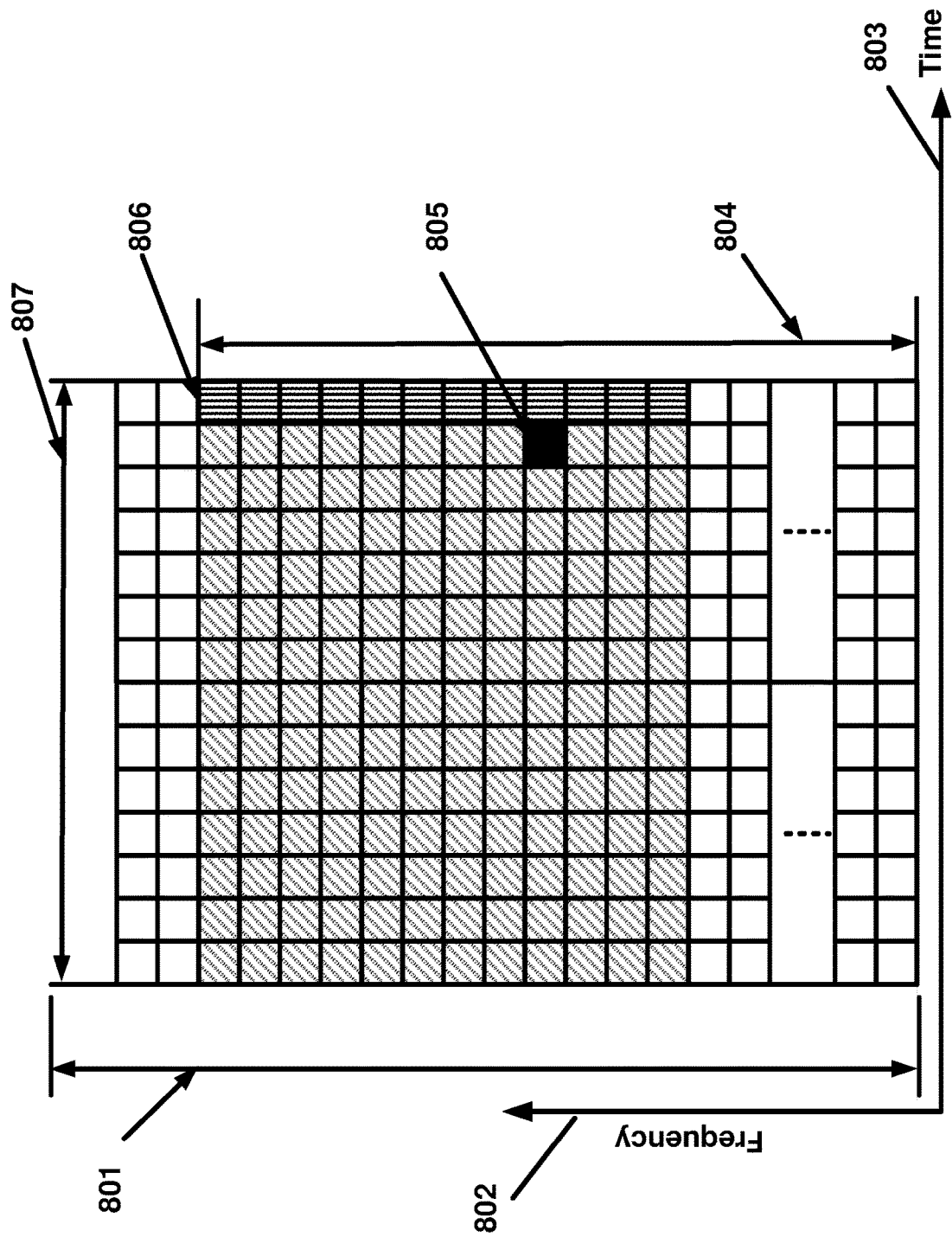
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
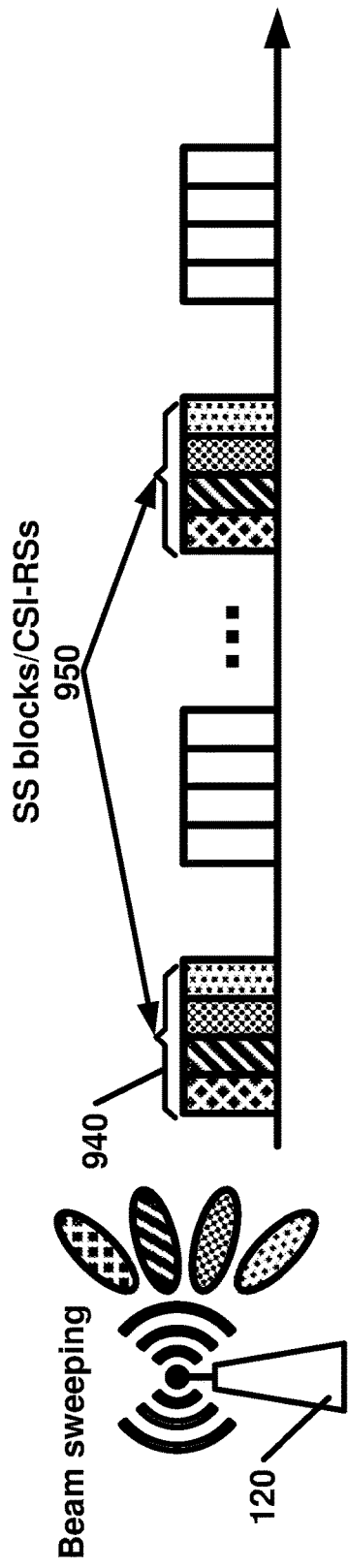
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
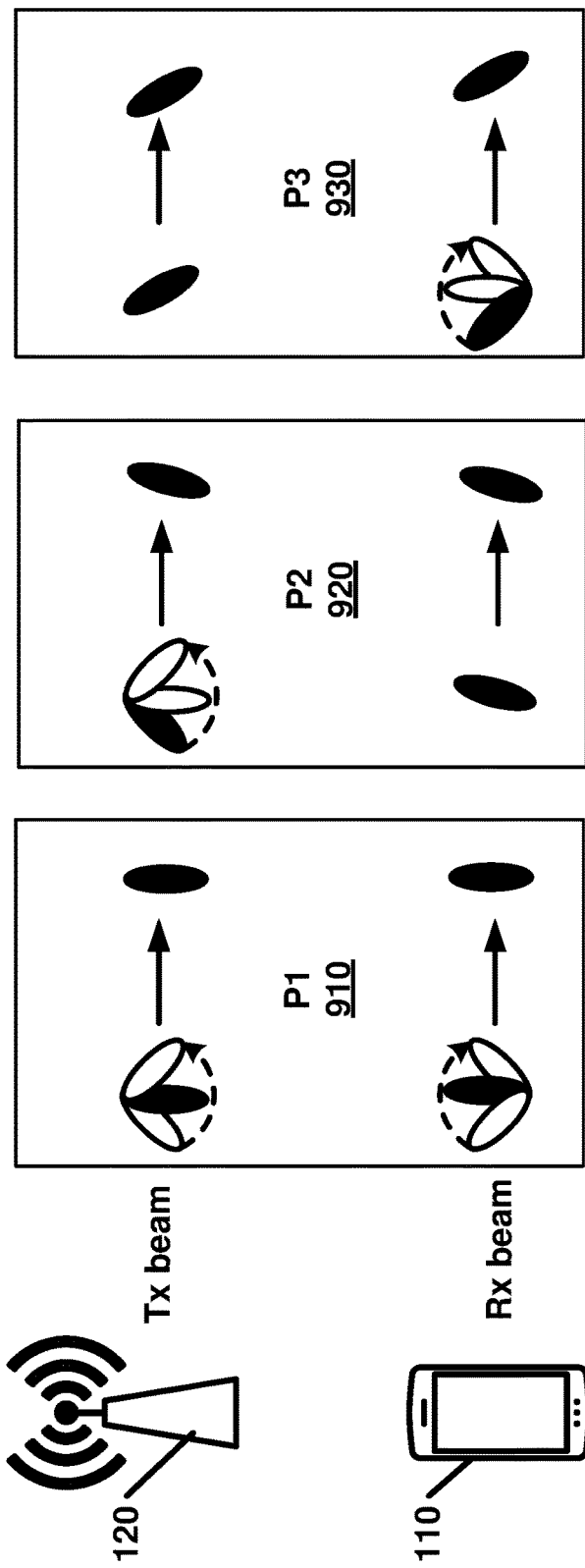
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
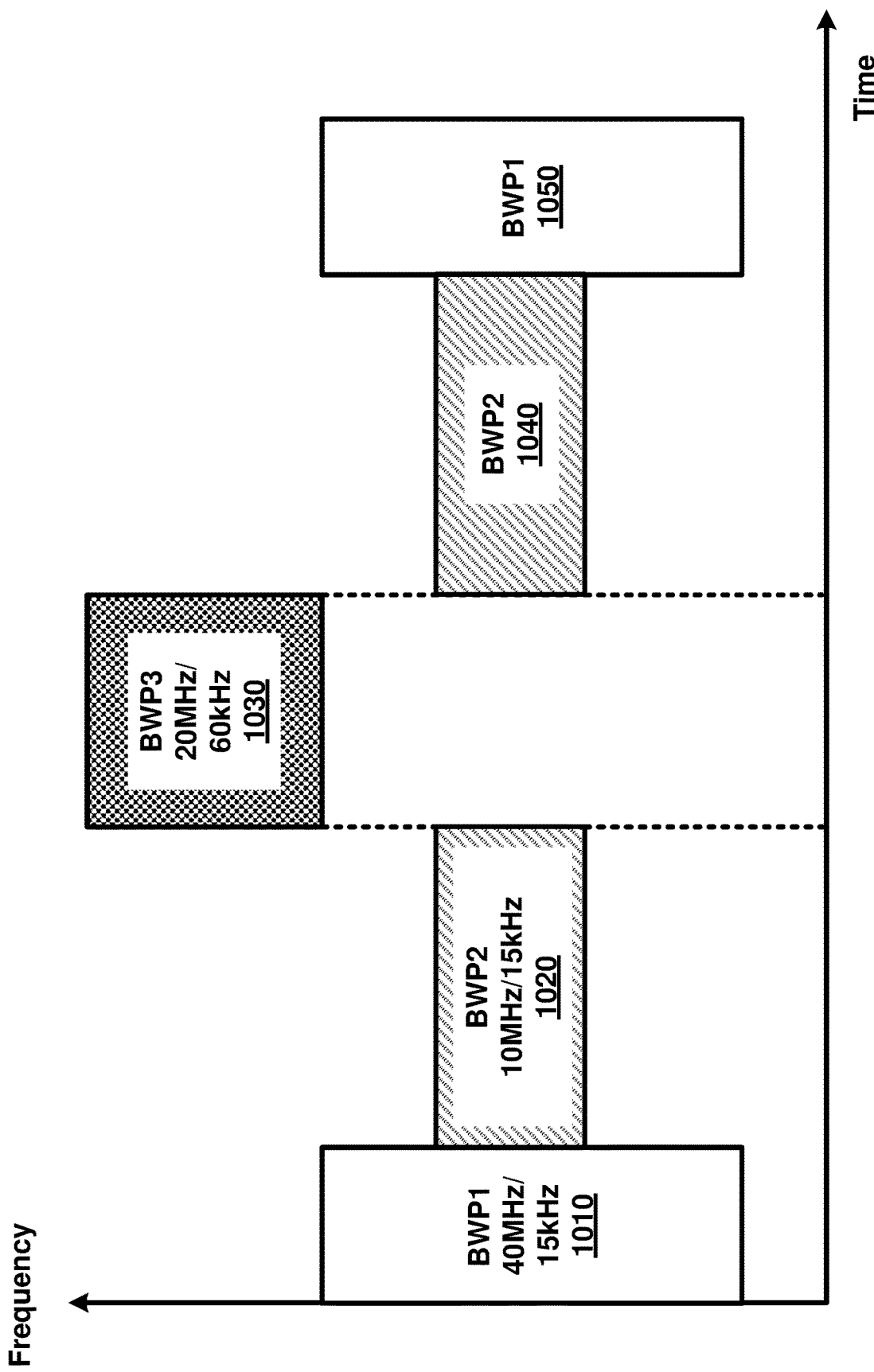
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
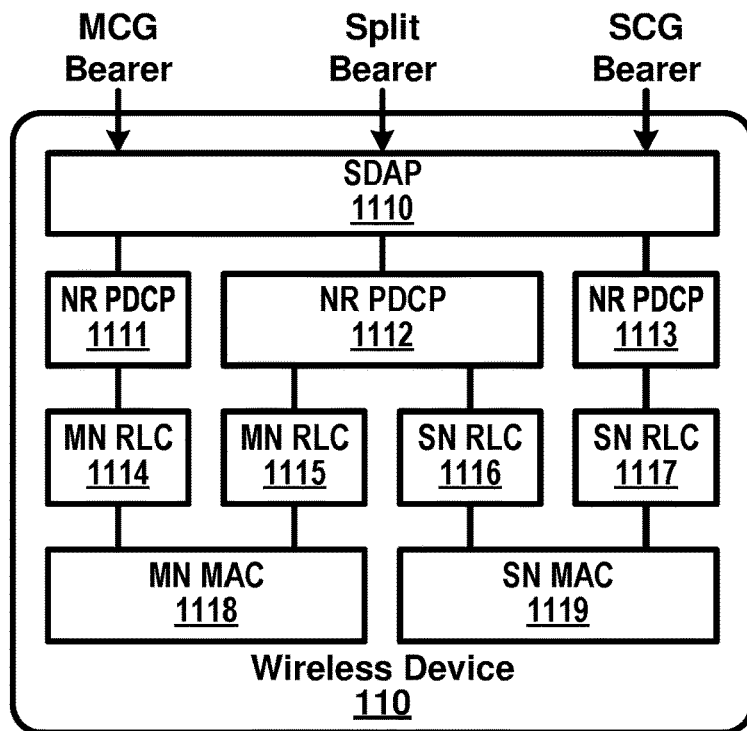
FIG. 11A, and FIG. 11B are diagrams of an example multi connectivity as per an aspect of an embodiment of the present disclosure.
Figure 11B:
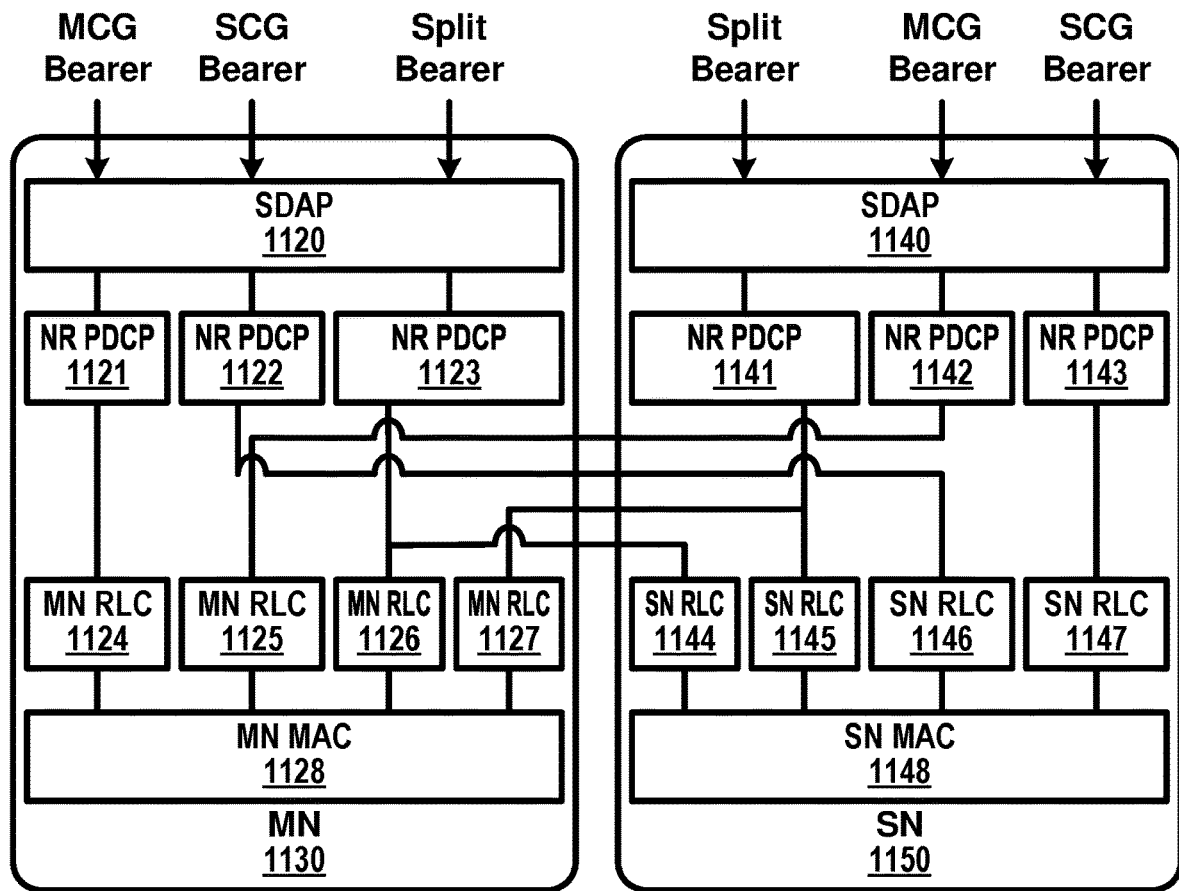

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
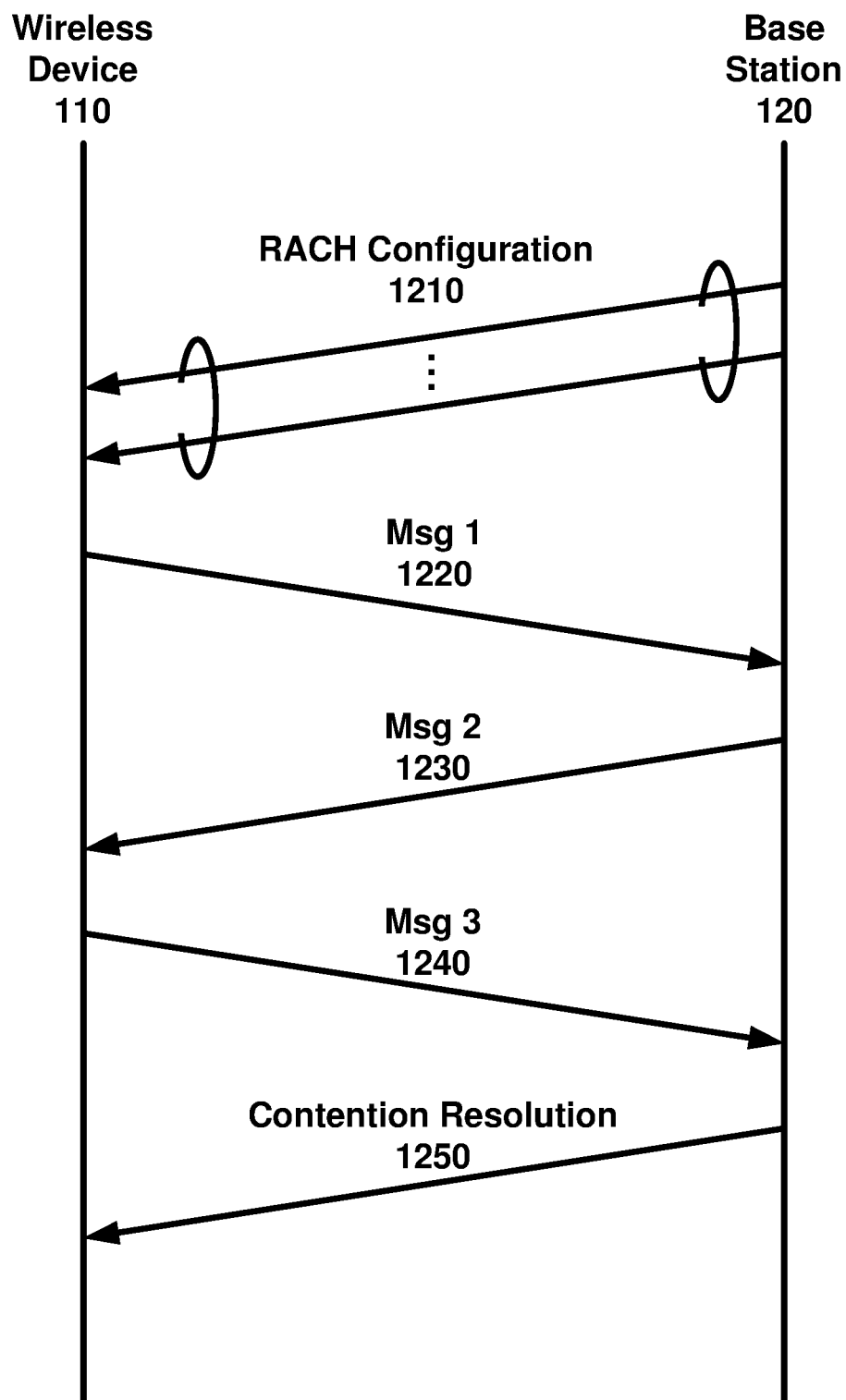
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronised, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises only a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
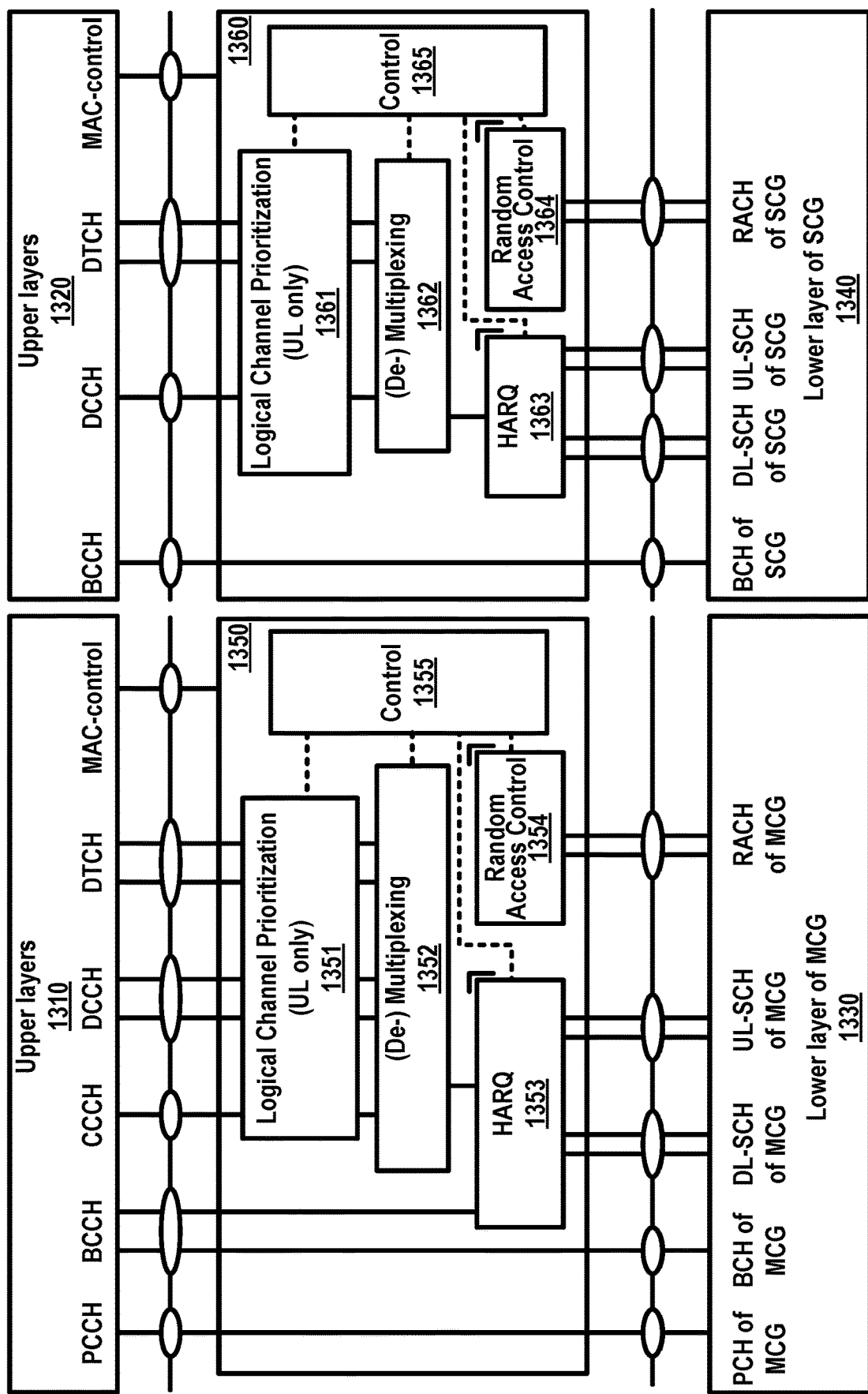
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection reestablishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
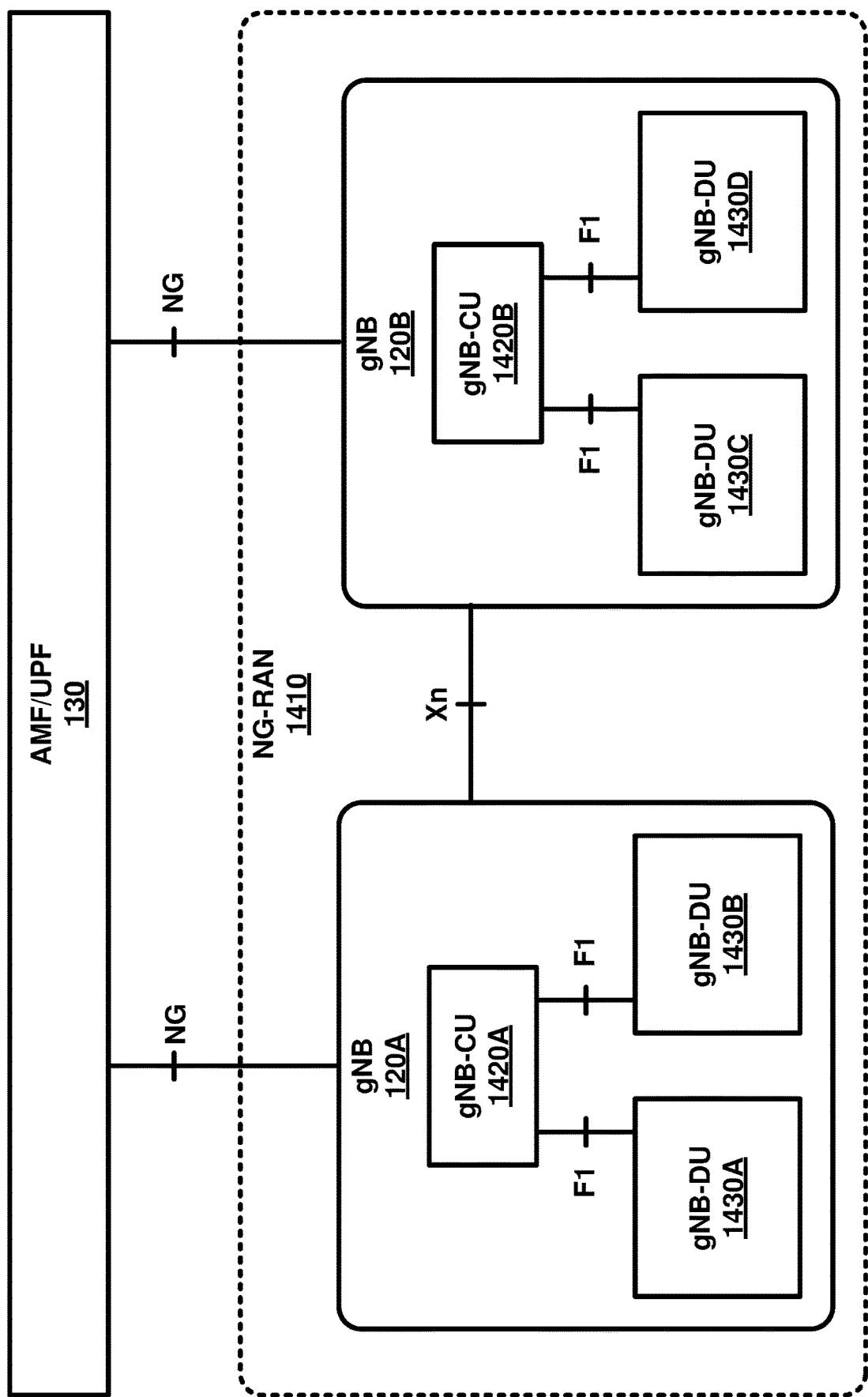
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
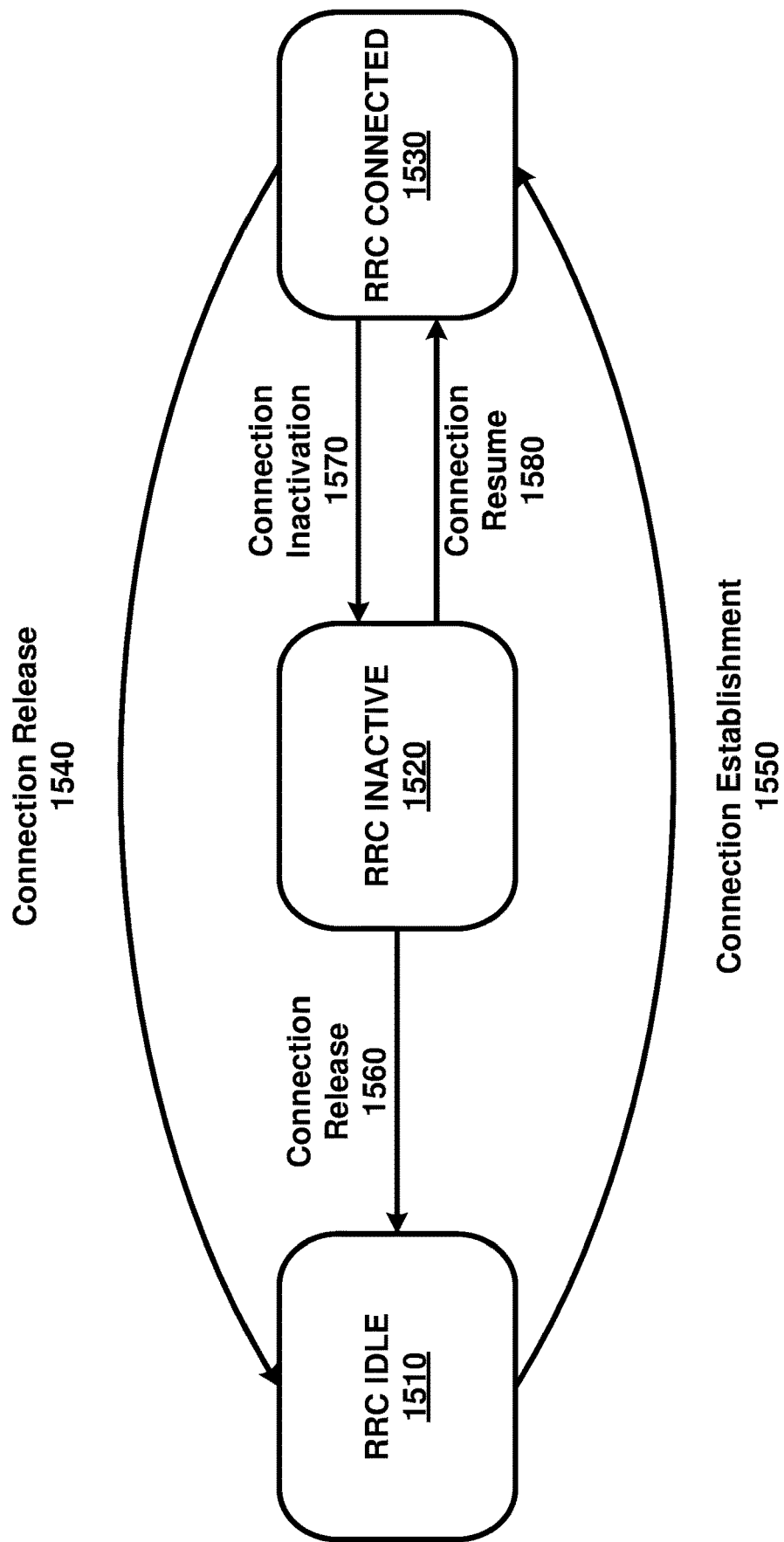
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

In a legacy system, a wireless device that experiences a connection failure (for example, a radio link failure, a handover failure, and/or the like) provides, for a base station, a radio link failure (RLF) report comprising information of the connection failure. The information of the connection failure may comprise configuration parameters and/or measurement results of a failed cell. Based on the information of the connection failure, the base station may configure radio resource parameters for one or more wireless devices (for example, to reduce connection failure issues of serving wireless devices). In an implementation of existing technologies, when a wireless device experiences a connection failure due to improper beam failure recovery configurations, a base station may consider and update cell level configuration parameters (for example, parameters for whole beams of a failed cell and/or per-cell parameters). Considering cell level configuration parameters, when a certain beam failure recovery configuration or a certain beam has a problem, is inefficient. The inefficient cell parameter reconfiguration may decrease efficient resource utilization and radio connection reliability of wireless devices. Existing technologies to handle connection failure issues that occur due to a beam failure need enhancements.

Example embodiments may enhance a radio link failure report by providing information of a beam failure recovery failure, so that a base station is able to identify a cause (for example, improper configurations for a beam failure recovery procedure) of wireless device's connection failure. A base station may employ information of a beam failure recovery failure to update radio configuration parameters to improve uplink/downlink connections.

In existing connection failure report signaling (e.g. RLF report via an RRC message), a wireless device (e.g. UE) provides failed cell information, measurement information at connection failure timing, radio configuration parameters, and/or connection failure cause information (e.g. T310 expiry, random access problem, RLC maximum number of retransmission, T312 expiry). A wireless device may further transmit a time of connection failure, carrier frequency information of a failed cell, and/or bearer configuration information at connection failure timing. A base station receiving a connection failure report may configure radio resource configuration parameters based on the connection failure report. Implementation of existing connection failure report may result in, for example, inefficient radio resource configurations, inefficient mobility parameter setting, or increased call dropping when a connection failure occurs due to a beam failure recovery request failure. For example, a base station in implementation of existing connection failure report may result in inefficient resource usage, increased handover failures, increased connection failure, or more frequent call dropping by configuring inefficient radio resource configuration parameters when a beam failure recovery request failure causes a connection failure. A beam failure recovery report failure introduces a need for further enhancement in connection failure report mechanism. Example embodiments enhance connection failure reports of wireless devices when a beam failure recovery request is failed. Example embodiments enhance connection failure report mechanism when a connection failure occur due to a beam failure recovery request failure.

In an example embodiment, a wireless device may experience a connection failure (e.g. radio link failure (RLF) and/or handover failure (HOF)) at a cell of a base station (e.g. gNB, eNB). The connection failure may be caused because of a failure of a beam failure recovery request procedure and/or because of expiration of a beam failure recovery timer. A wireless device may report a connection failure to the base station or other base station to which the wireless device (re)establishes a radio resource control (RRC) connection. The wireless device may send, to the first base station, a connection failure report comprising an RLF cause indicating that the connection failure is because of a failure of a beam failure recovery request procedure and/or because of expiration of a beam failure recovery timer. If the wireless device sends the connection failure report to the other base station from the base station where the connection failure occurs, the other base station may send the RLF cause to the base station. The base station receiving the RLF cause for the connection failure may determine one or more radio resource configuration parameters for one or more wireless devices based on the RLF cause. Example embodiments implement new mechanism to enhance radio resource configuration of a base station when a beam failure recovery request failure causes a connection failure. Example embodiments improve a connection failure report mechanism when a beam failure recovery request failure causes a connection failure. Example embodiments improve resource usage efficiency, handover efficiency, connection efficiency, or call efficiency by enabling a base station to configure radio resource configuration parameters in response to a connection failure caused due to a beam failure recovery request failure.

Connection Failure

In an example, a wireless device in an RRC connected state may experience (and/or determine) a connection failure from at least one cell of a base station. A connection failure may comprise a radio link failure (RLF) and/or a handover failure (HOF).

In an example, a wireless device may determine an RLF when one of following criteria are met: expiry of a timer started after indication of radio problems (e.g. out of sync) from a physical layer (if radio problems are recovered before the timer is expired, the UE may stop the timer); random access procedure failure; RLC failure (e.g. a number of retransmission is over a threshold); and/or the like. In an example, after the RLF is declared, the wireless device may: stay in an RRC_CONNECTED state (e.g. RRC connected state); select a suitable cell and initiate RRC re-establishment; enter an RRC_IDLE state (e.g. RRC idle state) if a suitable cell wasn't found within a certain time after the RLF was declared; stay at an RRC_INACTIVE state (e.g. RRC inactive state) if a suitable cell wasn't found within a certain time after the RLF was declared; and/or the like.

In an example, a behavior of a wireless device associated with the RLF may comprise two phases. A first phase may be started upon a radio problem detection; may lead to the RLF detection; may not initiate a UE based mobility; may be based on a timer (e.g. T1) or other criteria (e.g. counting); and/or the like. A second phase may be started upon the RLF or the HOF; may leads to an RRC idle state of the wireless device; may initiate a UE based mobility; may be based on a timer (e.g. T2); and/or the like. In an example, the wireless device in a normal operation of an RRC connected state may experience the first phase comprising the radio problem detection and no recovery during the T1, and/or may experience the second phase comprising no recovery during the T2. The second phase may be followed by an RRC idle state (e.g. the wireless device may go to an RRC idle state). During the normal operation, the first phase, and/or the second phase, the wireless device may be considered as being in an RRC connected state. In an example, the RLF may be considered as occurring between the first phase and the second phase (e.g. at an ending time of the first phase and/or at the starting time of the second phase).

In an example, upon detecting physical layer problems for a PCell, i.e. upon receiving N310 consecutive out-of-sync indications from lower layers, a wireless device may start a timer, T310. Upon receiving N311 consecutive in-sync indications from lower layers for the PCell, and/or upon triggering a handover procedure and upon initiating a connection re-establishment procedure, a wireless device may stop T310. In an example, when a timer, T310, is expired, if security is not activated, a wireless device may go to RRC_IDLE state; and/or if security is activated, a wireless device may initiate a connection re-establishment procedure.

In an example, upon initiating an RRC connection re-establishment procedure, a wireless device may start a timer, T311. Upon selecting a suitable cell of LTE/5G/another RAT, a wireless device may stop T311. If T311 is expired, a wireless device may enter an RRC_IDLE state.

In an example, a wireless device may detect the HOF that may occur due to a too early handover, a too late handover, a handover to wrong cell, and/or the like. In case of the too early handover, a radio link failure may occur shortly after a successful handover from a source cell to a target cell, and/or a handover failure may occur during a handover procedure. In case of the too early handover, the wireless device may attempt to reestablish a radio link connection in the source cell. In case of the too late handover, a radio link failure may occur after the wireless device may stay for a long period of time in a cell (e.g. a radio link failure may occur because a serving base station may not initiate a handover for the wireless device when a radio link quality is not good enough to serve the wireless device in a current cell.), and/or the wireless device may attempt to reestablish a radio link connection in a different cell. In case of the handover to wrong cell, a radio link failure may occur shortly after a successful handover from a source cell to a target cell, and/or a handover failure may occur during a handover procedure. In case of the handover to wrong cell, the UE may attempt to reestablish a radio link connection in a cell other than the source cell and the target cell. In an example, the "successful handover" may refer to wireless device's state of a successful completion of a random access (RA) procedure.

In an example, to resolve a problem of a connection failure (e.g. RLF and/or HOF), a wireless device and/or a network (e.g. a base station, a base station CU, a base station DU, a gNB, an eNB, a core network, and/or the like) may trigger one or more of following functions: a detection of the connection failure after an RRC reestablishment attempt; a detection of the connection failure after an RRC connection setup; a retrieval of information needed for problem analysis; and/or the like. Triggering of each of the functions may be optional, and/or may depend on situation and/or implementation.

Beam Configurations

A UE may be configured, for a serving cell, with a set of periodic CSI-RS resource configuration indexes by higher layer parameter, e.g. Beam-Failure-Detection-RS-ResourceConfig, and with a set of CSI-RS resource configuration indexes and/or SS/PBCH block indexes by higher layer parameter, e.g. Candidate-Beam-RS-List, for radio link quality measurements on the serving cell. If the UE is not provided with higher layer parameter, e.g. Beam-Failure-Detection-RS-ResourceConfig, the UE may determine to include SS/PBCH blocks and/or periodic CSI-RS configurations with same values for higher layer parameter, e.g. TCI-StatesPDCCH, as for control resource sets that the UE may be configured for monitoring PDCCH.

A physical layer of the UE may assess a radio link quality according to a set of resource configurations against the threshold $Q\_(out, LR)$. The threshold $Q\_(out, LR)$ may correspond to a default value of higher layer parameters, e.g. RLM-IS-OOS-thresholdConfig and/or Beam-failure-candidate-beam-threshold, respectively. For the set, the UE may assess a radio link quality according to periodic CSI-RS resource configurations and/or SS/PBCH blocks that may be quasi co-located, with a DM-RS of PDCCH receptions DM-RS monitored by the UE. The UE may apply the configured $Q\_(in, LR)$ threshold for periodic CSI-RS resource configurations. The UE may apply the $Q\_(out, LR)$ threshold for SS/PBCH blocks after scaling a SS/PBCH block transmission power with a value provided by higher layer parameter, e.g. Pc_SS.

The physical layer in the UE may, in slots where a radio link quality according to the set may be assessed, provide an indication to higher layers when a radio link quality for corresponding resource configurations in the set that the UE may use to assess the radio link quality is worse than the threshold $Q\_(out, LR)$. The UE may provide to higher layers information identifying a periodic CSI-RS configuration index or SS/PBCH block index from the set.

A UE may be configured with one control resource set (CORESET) by higher layer parameter, e.g. Beam-failure-Recovery-Response-CORESET. The UE may receive from higher layers, by parameter, e.g. Beam-failure-recovery-request-RACH-Resource, a configuration for a PRACH transmission. After 4 slots from the slot of the PRACH transmission, the UE may monitor PDCCH for a DCI format with CRC scrambled by C-RNTI, within a window configured by higher layer parameter, e.g. Beam-failure-recovery-request-window, and/or may receive PDSCH according to an antenna port quasi co-location associated with periodic CSI-RS configuration or SS/PBCH block with index in set, in the CORESET configured by higher layer parameter, e.g. Beam-failure-Recovery-Response-CORESET.

In an example, a beam failure recovery request procedure may be used for indicating to a serving gNB of a new synchronization signal block (SSB) or channel state information reference signal (CSI-RS) when beam failure is detected on a serving SSB(s) and/or CSI-RS(s). Beam failure may be detected by lower layers of a wireless device and/or indicated to a MAC entity of the wireless device.

In an example, if a MAC entity receives beam failure indication from lower layers (e.g. physical layer), the MAC entity may start a beam failure recover timer (e.g. beamFailureRecoveryTimer), and/or may initiate a random access procedure on a SpCell. If the beam failure recovery timer expires, the MAC entity may indicate beam failure recovery request failure to upper layers (e.g. RRC layer). In an example, the MAC entity receives downlink assignment and/or uplink grant on a PDCCH addressed for a C-RNTI, the MAC entity may stop/reset the beam failure recover timer and/or may consider a beam failure recovery request procedure successfully completed.

A NR (New Radio) may support both single beam and multi-beam operations. In a multi-beam system, gNB may need a downlink beam sweep to provide coverage for DL synchronization signals (SSs) and common control channels. To enable UEs to access the cell, the UEs may need the similar sweep for UL direction as well.

In the single beam scenarios, the network may configure time-repetition within one synchronization signal (SS) block, which may comprise at least PSS (Primary synchronization signal), SSS (Secondary synchronization signal), and PBCH (Physical broadcast channel), in a wide beam. In multi-beam scenarios, the network may configure at least some of these signals and physical channels (e.g. SS Block) in multiple beams such that a UE identifies at least OFDM symbol index, slot index in a radio frame and radio frame number from an SS block.

An RRC_INACTIVE or RRC_IDLE UE may need to assume that an SS Block may form an SS Block Set and, an SS Block Set Burst, having a given periodicity. In multi-beam scenarios, the SS Block may be transmitted in multiple beams, together forming an SS Burst. If multiple SS Bursts are needed to transmit beams, these SS Bursts together may form an SS Burst Set. Top: Time-repetition within one SS Burst in a wide beam. Middle: Beam-sweeping of a small number of beams using one SS Burst in the SS Burst Set. Bottom: Beam-sweeping of a larger number of beams using more than one SS Burst in the SS Burst Set to form a complete sweep.

In the multi-beam scenario, for the same cell, PSS/SSS/PBCH may be repeated to support cell selection/reselection and initial access procedures. There may be some differences in the conveyed PRACH configuration implied by the TSS (Tertiary synchronization signal) on a beam basis within an SS Burst. Under the assumption that PBCH carries the PRACH configuration, a gNB may broadcast PRACH configurations possibly per beam where the TSS may be utilized to imply the PRACH configuration differences.

In an example, the base station may transmit to a wireless device one or more messages comprising configuration parameters of one or more cells. The configuration parameters may comprise parameters of a plurality of CSI-RS signal format and/or resources. Configuration parameters of a CSI-RS may comprise one or more parameters indicating CSI-RS periodicity, one or more parameters indicating CSI-RS subcarriers (e.g. resource elements), one or more parameters indicating CSI-RS sequence, and/or other parameters. Some of the parameters may be combined into one or more parameters. A plurality of CSI-RS signals may be configured. In an example, the one or more message may indicate the correspondence between SS blocks and CSI-RS signals. The one or more messages may be RRC connection setup message, RRC connection resume message, and/or RRC connection reconfiguration message. In an example, a UE in RRC-Idle mode may not be configured with CSI-RS signals and may receive SS blocks and may measure a pathloss based on SS signals. A UE in RRC-connected mode, may be configured with CSI-RS signals and may be measure pathloss based on CSI-RS signals. In an example, a UE in RRC inactive mode may measure the pathloss based on SS blocks, e.g. when the UE moves to a different base station that has a different CSI-RS configuration compared with the anchor base station.

In a multi-beam system, a NR may configure different types of PRACH resources that may be associated with SS blocks and/or DL beams. In NR, a PRACH transmission occasion may be defined as the time-frequency resource on which a UE transmits a preamble using the configured PRACH preamble format with a single particular Tx beam and for which gNB performs PRACH preamble detection. One PRACH occasion may be used to cover the beam non-correspondence case. gNB may perform RX sweep during PRACH occasion as UE TX beam alignment is fixed during single occasion. A PRACH burst may mean a set of PRACH occasions allocated consecutively in time domain, and a PRACH burst set may mean a set of PRACH bursts to enable full RX sweep.

There may be an association between SS blocks (DL signal/channel) and PRACH occasion and a subset of PRACH preamble resources. One PRACH occasion may comprise a set of preambles. In multi beam operation, the gNB may need to know which beam or set of beams it may use to send RAR and the preambles may be used to indicate that. NR may configure following partitioning and mappings in multi beam operation:

The timing from SS block to the PRACH resource may be indicated in the MIB. In an example, different TSS may be used for different timings such that the detected sequence within TSS indicates the PRACH resource. This PRACH configuration may be specified as a timing relative to the SS block, and may be given as a combination of the payload in the MIB and another broadcasted system information.

Association between SS block and a subset of RACH resources and/or a subset of preamble indices may be configured so that TRP may identify the best DL beam for a UE according to resource location or preamble index of received preamble. An association may be independent and at least either a subset of RACH resources or subset of preamble indices may not be allowed to be associated with multiple SS blocks.

PRACH resources may be partitioned on SS-blocks basis in multiple beams operation. There may be one to one and/or many to one mapping between SS-blocks and PRACH occasions. UE may detect SS-block based on DL synchronization signals and differentiate SS-blocks based on the time index. With one-to-one mapping of beam or beams used to transmit SS-block and a specific PRACH occasion, the transmission of PRACH preamble resource may be an indication informed by a UE to gNB of the preferred SS-block. This way the PRACH preamble resources of single PRACH occasion may correspond to specific SS-block and mapping may be done based on the SS-block index. There may be one to one mapping between an SS-block beam and a PRACH occasion. There may not be such mapping for the SS-block periodicity and RACH occasion periodicity.

Depending on the gNB capability (e.g. the used beamforming architecture), there may not be one to one mapping between single SS-block and single RACH occasion. In case beam or beams used for transmitting SS-block and receiving during RACH occasion do not correspond directly, e.g., gNB may form receive beams that cover multiple SS-blocks beams, the preambles of PRACH occasion may be divided between the different SS-blocks in a manner that a subset of PRACH preambles map to specific SS-block.

With beam-specific PRACH resources, a gNB DL TX beam may be associated with a subset of preambles. The beam specific PRACH preambles resources may be associated with DL TX beams that are identified by periodical beam and cell specific CSI-RS for L3 Mobility (same signals may be used for L2 beam management/intra-cell mobility as well). A UE may detect the beams without RRC configuration, e.g., reading the beam configuration from minimum SI (MIB/SIB).

The PRACH resource mapping to specific beams may use SS-block association. Specific beams may be associated with the beams used for transmitting SS-block. gNB may transmit SS-block using one or multiple beams (in case of analogue/hybrid beamforming), but individual beams may not be detected. From the UE perspective, this is a single beam transmission. gNB may transmit CSI-RS (for Mobility) using individual beams associated with specific SS-block. A UE may detect individual beams based on the CSI-RS.

PRACH occasion may be mapped to corresponding SS-block, and a set of PRACH preambles may be divided between beams. Similar to mapping of multiple SS-blocks to single PRACH occasion, multiple beams of an SS-block may be mapped to at least one PRACH occasion.

If a PRACH occasion is configured with k preambles, and a PRACH occasion is configured to be SS-block specific, the whole set of preambles may be used to indicate the specific SS-block. In this case, there may be N PRACH occasions corresponding to N SS-blocks.

If multiple SS-blocks are mapped to single PRACH occasion, then the preambles may be divided between SS-blocks and depending on the number of SS-blocks, the available preambles per SS-block may be K/N (K preambles, N SS-blocks).

If K SS-block specific preambles are divided between CSI-RS beams in the corresponding PRACH occasions, the number of available preambles per beam may be determined by the K preambles/number of beams.

If the preambles are partitioned in SS-block specific manner, the UE may indicate preferred SS-block but not the preferred individual DL TX beam to gNB.

The network may configure mapping/partitioning PRACH preamble resources to SS-blocks and/or to individual beams. A UE may determine the used partitioning of PRACH preambles, as much as possible, e.g. based on the PRACH configuration.

Beam-specific PRACH configurations may be configurable when a gNB uses analog RX beamforming. In that case, when a UE sends, for example, a preamble in a beam-specific time/frequency slot associated with one or multiple SS Block transmissions, then the gNB may use the appropriate RX beamforming when receiving the preamble in that time/frequency slot and use the corresponding DL beam when transmitting the RAR. Hence, beam-specific PRACH configurations may allow the gNB to direct its Rx beamforming in the direction of the same beam when monitoring the associated PRACH resources.

In the multi-beam RACH scenario, thanks to the mapping between DL SS beams and PRACH configuration, e.g. time/frequency slot and possibly preamble partitioning, a UE may be under the coverage of a given DL beam or at least a subset of them in a cell. That may enable the network to send a RAR in this best DL beam and/or perform a more optimized beam sweeping procedure e.g. not transmitting the same RAR message in possible beams (e.g. transmitting the RAR in a single beam as in the figure below).

NR may support the contention-free scenarios in a way to provide a dedicated RACH resource for the preamble transmission as in LTE for handover, DL data arrival, positioning and obtaining timing advance alignment for a secondary TAG. For the handover case, a UE may be configured to measure on one or more SS blocks or other RS in a neighboring cell. If one of the neighboring cell SS-block measurements triggers a handover request, the source gNB may signal a preferred beam index in a handover request to the target gNB. The target gNB in turn may provide a beam-specific dedicated RACH resource (including preamble) in the handover command. In an example, the target gNB may provide a set of dedicated resources e.g. one for at least one SS-block in the handover command. The UE then may transmit Msg1 using the dedicated preamble corresponding to the preferred DL beam in the target cell.

In an example, a cell may be operated with one or more beams employing a multi-antenna system. A beam may have a spatial direction, and/or may cover a part of a cell coverage area. A combination of one or more beam spatial areas may form a cell coverage. In an example, a beam transmitting a synchronization signal and/or receiving a signal from a wireless device may be swept over a cell coverage area in a predetermined way. A synchronization signal index, a synchronization signal scheduling information, and/or a synchronization signal sequence information may be used to identify a swept beam. A swept beam may broadcast one or more control information comprising at least one of a system information, a master information, a PDCCH, a PRACH resource, a random access preamble information, a synchronization signal, a reference signal, and/or the like. In an example, a beam may transmit a reference signal (e.g. CSI-RS). A beam may be also identified by a reference signal (e.g. CSI-RS, DM-RS, and the like) index, a reference signal scheduling information, and/or a reference signal sequence information.

In an example, one or more beams may be managed via a set of L1/L2 procedures to acquire and maintain a set of TRP(s)(Transmission Reception Point) and/or UE beams that may be used for DL and UL transmission/reception, which may include at least following aspects: Beam determination (for TRP(s) or UE to select of its own Tx/Rx beam(s)), Beam measurement (for TRP(s) or UE to measure characteristics of received beamformed signals), Beam reporting (for UE to report information of beamformed signal(s) based on beam measurement), and/or Beam sweeping (operation of covering a spatial area, with beams transmitted and/or received during a time interval in a predetermined way).

In an example, the followings may be defined as Tx/Rx beam correspondence at TRP and UE. Tx/Rx beam correspondence at TRP holds if at least one of the following is satisfied: TRP may be able to determine a TRP Rx beam for the uplink reception based on UE's downlink measurement on TRP's one or more Tx beams; and/or TRP may be able to determine a TRP Tx beam for the downlink transmission based on TRP's uplink measurement on TRP's one or more Rx beams. Tx/Rx beam correspondence at UE may hold if at least one of the following is satisfied: UE may be able to determine a UE Tx beam for the uplink transmission based on UE's downlink measurement on UE's one or more Rx beams; UE may be able to determine a UE Rx beam for the downlink reception based on TRP's indication based on uplink measurement on UE's one or more Tx beams; and/or capability indication of UE beam correspondence related information to TRP may be supported.

In an example, the following DL L1/L2 beam management procedures (e.g. P-1, P-2, and P-3) may be supported within one or multiple TRPs. P-1 may be used to enable UE measurement on different TRP Tx beams to support selection of TRP Tx beams/UE Rx beam(s). For beamforming at TRP, it typically may include a intra/inter-TRP Tx beam sweep from a set of different beams. For beamforming at UE, it may include a UE Rx beam sweep from a set of different beams. P-2 may be used to enable UE measurement on different TRP Tx beams to possibly change inter/intra-TRP Tx beam(s). From a possibly smaller set of beams for beam refinement than in P-1. P-2 may be a special case of P-1. P-3 may be used to enable UE measurement on the same TRP Tx beam to change UE Rx beam in the case UE uses beamforming. At least network triggered aperiodic beam reporting may be supported under P-1, P-2, and P-3 related operations.

In an example, UE measurement based on RS for beam management (at least CSI-RS) may be composed of K (=total number of configured beams) beams, and/or UE may report measurement results of N selected Tx beams, where N may not be necessarily fixed number. The procedure based on RS for mobility purpose may be not precluded. Reporting information may at least include measurement quantities for N beam (s) and information indicating N DL Tx beam(s), if N <K. Specifically, when a UE is configured with K'>1 non-zero power (NZP) CSI-RS resources, a UE may report N' CRIs (CSI-RS Resource Indicator). A UE may be configured with the following high layer parameters for beam management. N≥1 reporting settings, M≥1 resource settings: the links between reporting settings and resource settings may be configured in the agreed CSI measurement setting; CSI-RS based P-1 & P-2 may be supported with resource and reporting settings; and/or P-3 may be supported with or without reporting setting. A reporting setting at least including: information indicating selected beam(s); L1 measurement reporting; time-domain behavior, e.g. aperiodic, periodic, semi-persistent; and/or frequency-granularity if multiple frequency granularities are supported. A resource setting at least including: time-domain behavior, e.g. aperiodic, periodic, semi-persistent; RS type, e.g. NZP CSI-RS at least; at least one CSI-RS resource set, with each CSI-RS resource set having K≥1 CSI-RS resources (Some parameters of K CSI-RS resources may be the same, e.g. port number, time-domain behavior, density and periodicity if any).

In an example, a beam reporting may be supported at least based on an alternative 1 as follow. UE may report information about TRP Tx Beam(s) that may be received using selected UE Rx beam set(s) where a Rx beam set may refer to a set of UE Rx beams that may be used for receiving a DL signal. It may be UE implementation issues on how to construct the Rx beam set. One example may be that each of Rx beam in a UE Rx beam set may correspond to a selected Rx beam in each panel. For UEs with more than one UE Rx beam sets, the UE may report TRP Tx Beam(s) and an identifier of the associated UE Rx beam set per reported TX beam(s). Different TRP Tx beams reported for the same Rx beam set may be received simultaneously at the UE. Different TRP TX beams reported for different UE Rx beam set may not be possible to be received simultaneously at the UE.

In an example, a beam reporting may be supported at least based on an alternative 2 as follow. UE may report information about TRP Tx Beam(s) per UE antenna group basis where UE antenna group may refer to receive UE antenna panel or subarray. For UEs with more than one UE antenna group, the UE may report TRP Tx Beam(s) and an identifier of the associated UE antenna group per reported TX beam. Different TX beams reported for different antenna groups may be received simultaneously at the UE. Different TX beams reported for the same UE antenna group may not be possible to be received simultaneously at the UE.

In an example, NR may support the following beam reporting considering L groups where L>=1 and/or each group may refer to a Rx beam set (alternative 1) or a UE antenna group (alternative 2) depending on which alternative may be adopted. For each group L, UE may report at least the following information: information indicating group at least for some cases; measurement quantities for N_L beam(s), which may support L1 RSRP and CSI report (when CSI-RS is for CSI acquisition); and/or information indicating N_L DL Tx beam(s) when applicable. This group based beam reporting may be configurable per UE basis. This group based beam reporting may be turned off per UE basis, e.g. when L=1 or N_L=1. Group identifier may not be reported when it is turned off.

In an example, NR (New Radio) may support that UE may be able to trigger mechanism to recover from beam failure. Beam failure event may occur when the quality of beam pair link(s) of an associated control channel falls low enough (e.g. comparison with a threshold, time-out of an associated timer). Mechanism to recover from beam failure may be triggered when beam failure occurs. The beam pair link may be used for convenience, and may or may not be used in specification. Network may configure to UE with resources for UL transmission of signals for recovery purpose. Configurations of resources may be supported where the base station may be listening from all or partial directions, e.g. random access region. The UL transmission/resources to report beam failure may be located in the same time instance as PRACH (resources orthogonal to PRACH resources) and/or at a time instance (configurable for a UE) different from PRACH. Transmission of DL signal may be supported for allowing the UE to monitor the beams for identifying new potential beams.

In an example, NR may support beam management with and without beam-related indication. When beam-related indication is provided, information pertaining to UE-side beamforming/receiving procedure used for CSI-RS-based measurement may be indicated through QCL (Quasi Co-Location) to UE. NR may support using the same or different beams on control channel and the corresponding data channel transmissions.

In an example, for NR-PDCCH transmission supporting robustness against beam pair link blocking, UE may be configured to monitor NR-PDCCH on M beam pair links simultaneously, where M>1 and the maximum value of M may depend at least on UE capability. UE may be configured to monitor NR-PDCCH on different beam pair link(s) in different NR-PDCCH OFDM symbols. Parameters related to UE Rx beam setting for monitoring NR-PDCCH on multiple beam pair links may be configured by higher layer signaling or MAC CE and/or considered in the search space design. At least, NR may support indication of spatial QCL assumption between an DL RS antenna port(s), and DL RS antenna port(s) for demodulation of DL control channel. Candidate signaling methods for beam indication for a NR-PDCCH (i.e. configuration method to monitor NR-PDCCH) may be MAC CE signaling, RRC signaling, DCI signaling, specification-transparent and/or implicit method, and combination of these signaling methods. Indication may not be needed for some cases.

In an example, for reception of unicast DL data channel, NR may support indication of spatial QCL assumption between DL RS antenna port(s) and DMRS antenna port(s) of DL data channel. Information indicating the RS antenna port(s) may be indicated via DCI (downlink grants). The information may indicate the RS antenna port(s) which may be QCL-ed with DMRS antenna port(s). Different set of DMRS antenna port(s) for the DL data channel may be indicated as QCL with different set of RS antenna port(s). Indication may not be needed for some cases.

Example Embodiments

Figure 16:
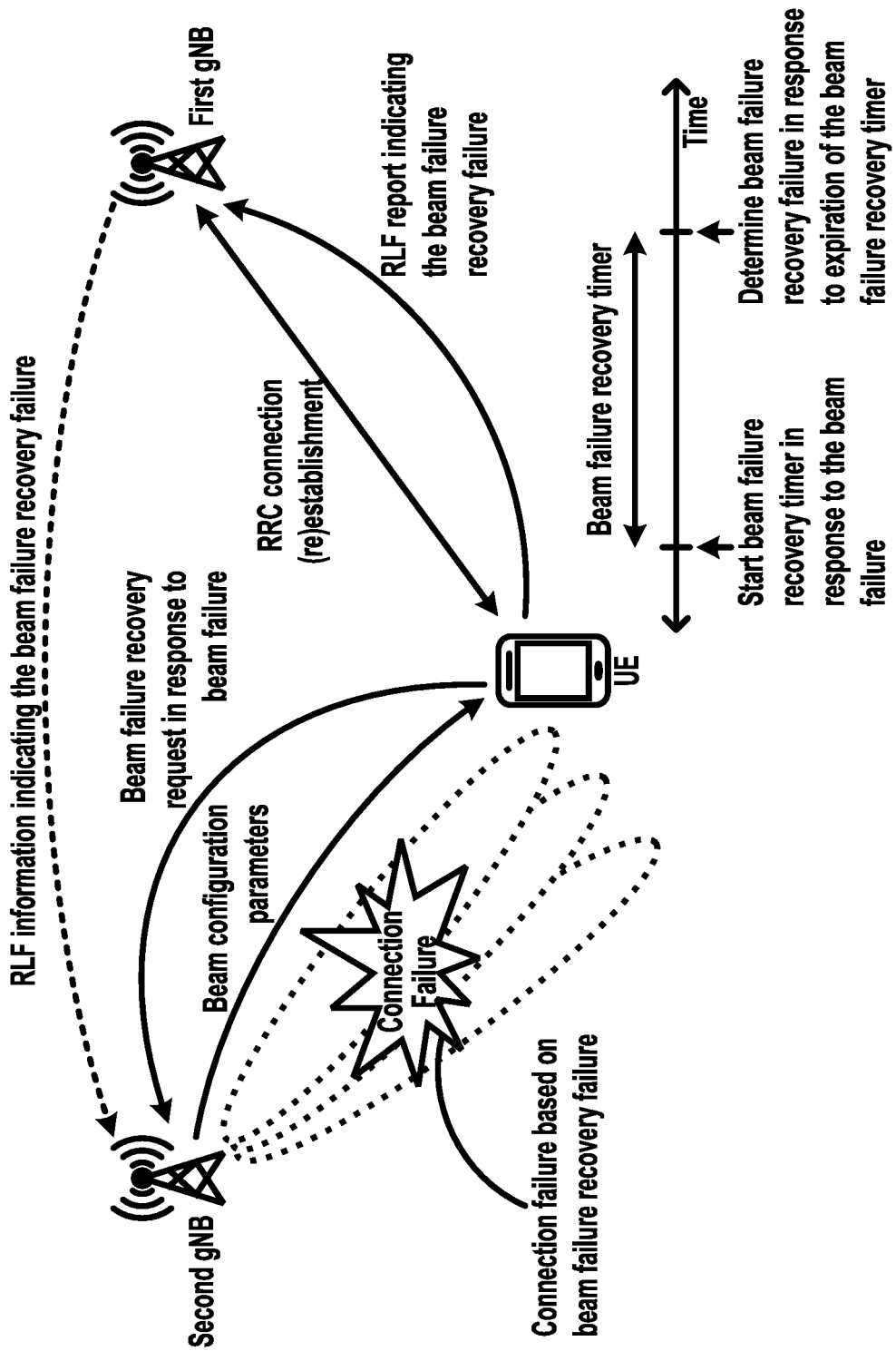
FIG. 16 is an example diagram of an aspect of an embodiment of the present disclosure.
Figure 17:
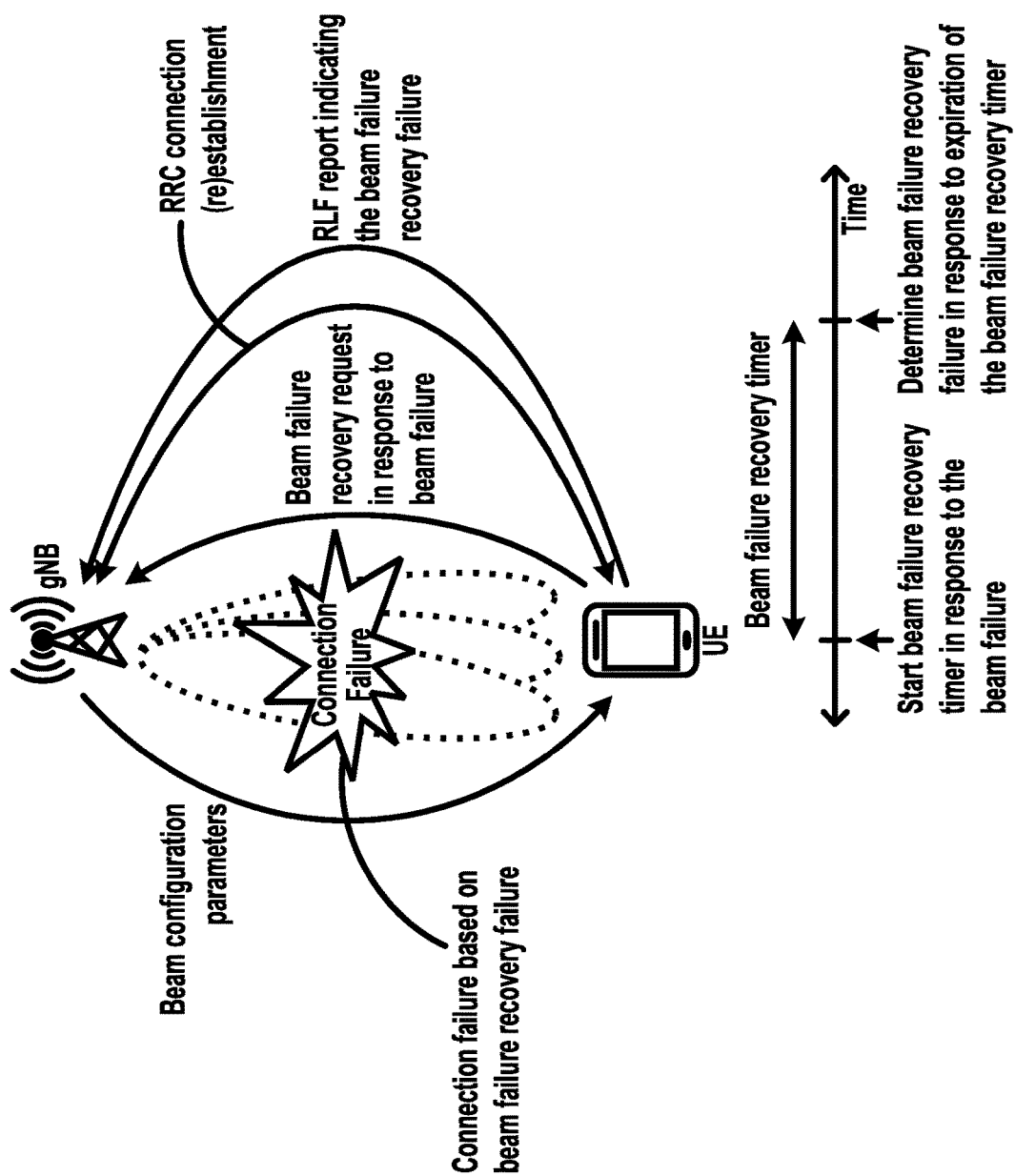
FIG. 17 is an example diagram of an aspect of an embodiment of the present disclosure.
Figure 21:
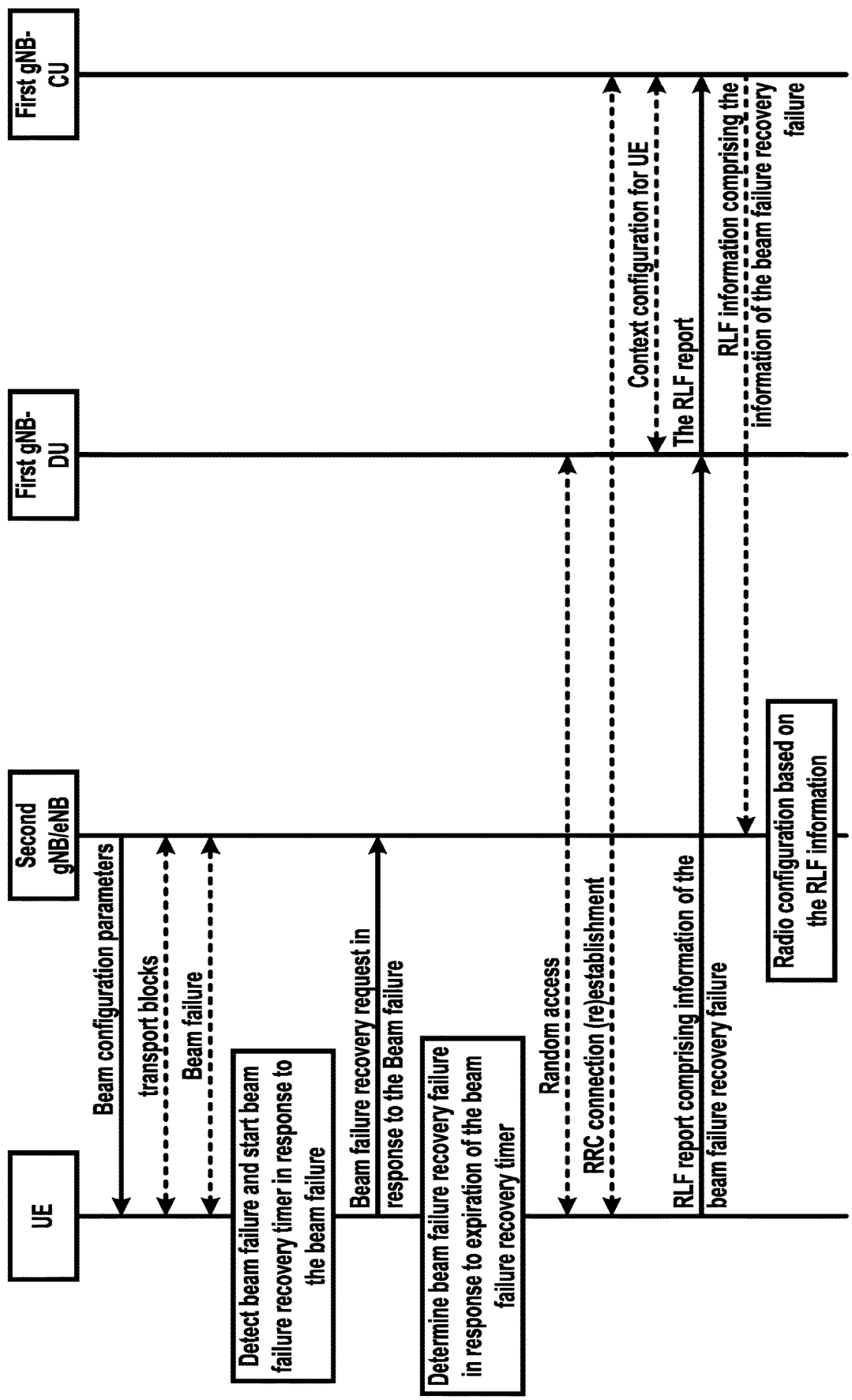
FIG. 21 is an example diagram of an aspect of an embodiment of the present disclosure.

In an example, as shown in FIG. 16, FIG. 17, and/or FIG. 21, a base station (e.g. gNB, eNB, gNB-CU and gNB-DU, and/or the like) may serve a wireless device at least via a first cell. The first cell may be a cell of the base station and/or a primary cell of the wireless device. In an example, the base station may configure one or more secondary cells for the wireless device. In an example, the base station may transmit a RRC message to the wireless device. The RRC message may comprise at least one of RRC connection reconfiguration message, RRC connection reestablishment message, RRC connection resume message, RRC connection setup message, and/or the like. The RRC message may be transmitted via the first cell. In an example, the RRC message may comprise beam configuration parameters for one or more beams. The one or more beams may comprise one or more channel state information-reference signal (CSI-RS) beams and/or one or more synchronization signal (SS) beams.

In an example the beam configuration parameters may comprise at least one of CSI-RS beam indexes, SS beam indexes, BRACH resource configurations, BRACH preamble configuration parameters, beam based SRS transmission configuration information, beam based CSI-RS configuration parameters, beam based SS configuration parameters, beam failure recovery timer, number of random access preamble transmission repetitions, beam measurement configuration parameters, and/or the like. In an example, the beam configuration parameters may comprise at least one of beam failure detection RS resource configuration information (e.g. Beam-Failure-Detection-RS-ResourceConfig), candidate beam RS list (e.g. Candidate-Beam-RS-List) for radio link quality measurements on the serving cell, beam failure candidate beam received power threshold (e.g. Beam-failure-candidate-beam-threshold), control resource set (CORESET) information for beam failure recovery response (e.g. Beam-failure-Recovery-Response-CORESET), RACH resource for beam failure recovery procedure (e.g. Beam-failure-recovery-request-RACH-Resource), time window information for beam failure recovery request (e.g. Beam-failure-recovery-request-window), TCI-StatesPDCCH, and/or the like.

The wireless device may measure beam quality (e.g. RSRP, RSRQ, and/or the like) of the one or more beams, and/or may report measurement results of beam quality of at least one of the one or more beams to the base station. The wireless device may employ at least one of the one or more beams to transmit transport blocks (e.g. for control signaling and/or for data signaling). The wireless device may employ at least one of the one or more beams to receive transport blocks (e.g. for control signaling and/or for data signaling).

In an example, the base station may receive, from the wireless device, one or more random access (RA) preambles via at least one of the one or more beams. In an example, the base station may transmit, to the wireless device, one or more RA response (RAR) messages via at least one of the one or more beams. In an example, at least one of the one or more beams may be chosen by the base station and/or the wireless device through a beam refinement procedure.

In an example, the wireless device may detect a beam failure on one or more first beams (e.g. on at least one beam of the one or more beams) of the first cell. The beam failure may be detected based on the beam failure detection RS resource configuration information. The beam failure may be detected based on a received power (e.g. RSRP, RSRQ) via the one or more first beams. The beam failure may be detected in response to a received power (e.g. RSRP, RSRQ) via the one or more first beams equals or is smaller than a power threshold value (e.g. received from a higher layer, and/or received from the base station). The beam failure may be detected based on a block error rate (e.g. BLER, bit error rate, BER) of one or more transport blocks received via the one or more first beams. For example, if the block error rate equals or is smaller than a block error rate threshold value (e.g. received from a higher layer, and/or received from the base station).

In an example, in response to detecting the beam failure, the wireless device may initiate a beam failure recovery request procedure. In an example, in response to detecting the beam failure, the wireless device may start a beam failure recovery timer, and/or may transmit one or more random access preambles (e.g. a random access preamble) to the base station. The beam failure recovery timer may be received from the base station via a higher layer (e.g. RRC layer) (e.g. via the beam configuration parameters). The transmission of the random access preamble may be based on the beam configuration parameters (e.g. candidate beam RS list, beam failure candidate beam received power threshold, control resource set (CORESET) information for beam failure recovery response, RACH resource for beam failure recovery procedure, time window information for beam failure recovery request, TCI-StatesPDCCH, and/or the like).

In an example, in response to expiration of the beam failure recovery timer, the wireless device may determine a beam failure recovery request failure. In an example, if the wireless device (e.g. MAC entity) receives downlink assignment and/or uplink grant on a PDCCH addressed for a C-RNTI within a time duration of the beam failure recovery timer, the wireless device (e.g. the MAC entity) may stop/reset the beam failure recover timer and/or may consider the beam failure recovery request procedure successfully completed. In an example, if the wireless device (e.g. MAC entity) does not receive downlink assignment and/or uplink grant on a PDCCH addressed for a C-RNTI within a time duration of the beam failure recovery timer, the wireless device (e.g. the MAC entity) may determine a beam failure recovery request failure.

In response to determining the beam failure recovery request failure, a lower layer (e.g. MAC layer, and/or physical layer) of the wireless device may indicate the beam failure recovery request failure to a higher layer (e.g. RRC layer) of the wireless device. The higher layer of the wireless device may determine a connection failure (e.g. radio link failure (RLF) and/or handover failure (HOF)) in the first cell (e.g. a failed cell) based on the beam failure recovery request failure. In an example, the wireless device may determine a connection failure in response to the beam failure recovery request failure, and/or determine a connection failure after a time duration of a connection failure timer (e.g. T310 or other type of timer). The connection failure timer may start before the beam failure recovery request failure (e.g. when receiving one or more out-of-sync indication, or when receiving a beam failure indication), or may start in response to the beam failure recovery request failure.

In an example, after determining the connection failure, the wireless device may determine (select/reselect) a second cell of a first base station based on a measurement result of the wireless device (e.g. RSRP, RSRQ). In an example, the base station (serving the first cell) may be the first base station as shown in FIG. 17 and/or FIG. 19, or the base station may be different from the first base station as shown in FIG. 16 and/or FIG. 18. In an example, the second cell may be the first cell, or the second cell may be different from the first cell. In response to determining the second cell, the wireless device may initiate a random access procedure to make an RRC connection via the second cell. In an example, the wireless device may send, to the first base station, an RRC connection reestablishment/setup/resume request message for an RRC connection reestablishment/setup/resume request. The RRC connection reestablishment/setup/resume request message may comprise an indication parameter indicating that the wireless device experienced a connection failure (e.g. RLF, HOF, reconfiguration failure, other failure, and/or the like). The indication parameter may indicate a cause of the RRC connection reestablishment/setup/resume request. The indication parameter may indicate that the wireless device has a report associated with a connection failure to transmit to a base station (e.g. the first base station).

In an example, the wireless device may receive, from the first base station, a UE information request message indicating a request to transmit a radio link failure (RLF) report to the first base station. In an example, the wireless device may transmit, to the first base station, a first message. In an example, the first message may be transmitted in response to the UE information request message. In an example, the first message may be an UE information response message (e.g. UEInformationResponse message). The first message may be an RRC message. In an example, the first message may comprise a radio link failure (RLF) report for the connection failure of the wireless device. The RLF report may be associated with the beam failure recovery request failure at the first cell of the base station.

In an example, the RLF report may comprise at least one of a cell identifier of the first cell, and/or one or more elements of the beam configuration parameters received from the base station of the first cell. In an example, the RLF report may comprise at least one of the CSI-RS beam indexes, the SS beam indexes, BRACH resource configurations, the BRACH preamble configuration parameters, the beam based SRS transmission configuration information, the beam based CSI-RS configuration parameters, the beam based SS configuration parameters, the beam failure recovery timer, the number of random access preamble transmission repetitions, the beam measurement configuration parameters, the beam failure detection RS resource configuration information (e.g. Beam-Failure-Detection-RS-ResourceConfig), candidate beam RS list (e.g. Candidate-Beam-RS-List) for radio link quality measurements on the serving cell, the beam failure candidate beam received power threshold (e.g. Beam-failure-candidate-beam-threshold), control resource set (CORESET) information for beam failure recovery response (e.g. Beam-failure-Recovery-Response-CORESET), the RACH resource for beam failure recovery procedure (e.g. Beam-failure-recovery-request-RACH-Resource), the time window information for beam failure recovery request (e.g. Beam-failure-recovery-request-window), the TCI-StatesPDCCH, and/or the like. In an example, if the beam failure recovery request is indicated by transmitting a PUCCH signal (e.g., via scheduling request resource on one or more cells, which may be at least one of the failed cell, a primary cell, a PUCCH secondary cell, etc.) and/or by transmitting a MAC CE (via one or more cells, which may be different from the failed cell), the RLF report may further comprise at least one of: a cell identifier of the cell via which the beam failure recovery request was transmitted, indicator of a PUCCH resource via which the beam failure recovery request was transmitted, and/or the like.

In an example, the RLF report may comprise one or more beam indexes of the one or more first beams (e.g. at least one beam of the one or more beams configured at the first cell) of the first cell. The one or more first beams have the beam failure and/or the beam failure recovery failure. The RLF report may comprise one or more recovery attempt beam indexes of one or more recovery attempt beams to which the wireless device attempted the beam failure recovery procedure (e.g. target beams for beam recovery or beams employed to transmit random access preambles for the beam failure recovery procedure) in response to the beam failure.

In an example, the RLF report may comprise one or more report information elements (IEs) indicating information associated with the connection failure of the wireless device. The one or more report IEs may indicate at least one of: a failed cell identifier of the failed cell (e.g. the first cell), wherein the wireless device experienced the connection failure at the failed cell; an RLF cause of the connection failure, wherein the RLF cause indicating at least one of a first information element (IE) indicating the connection failure is caused by the beam failure recovery request failure, a second information element (IE) indicating the connection failure is based on the expiration of the beam failure recovery timer, a t310 expiry, a random access problem, a radio link control (RLC) maximum number of retransmissions, or t312 expiry; a wireless device identifier of the wireless device at the failed cell; a carrier frequency value of the failed cell; a first time value (e.g. timeConnFailure) indicating time that elapsed since a last handover initialization for the wireless device until the connection failure; a second time value (e.g. timeSinceFailure) indicating time that elapsed since the connection failure (or an establishment failure); a connection failure type indicating whether the connection failure is due to an RLF or a handover failure; a measurement result, the measurement result comprising at least one of a reference signal received power result or a reference signal received quality; a quality classification indication 1 bearer indicating the connection failure occurred while a bearer with QCI value equal to 1 was configured; a C-RNTI of the wireless device at the first cell; and/or the like.

In an example, the failed cell identifier of the failed cell (e.g. the first cell) may comprise a global cell identifier (e.g. NCGI, ECGI, CGI, and/or the like), a physical cell identifier (e.g. PCI), and/or the like. In an example, the failed cell may be a primary cell of the wireless device when the connection failure (e.g. the beam failure recovery request failure) occurred.

In an example, the RLF cause of the connection failure may indicate that a cause of determining the connection failure of the wireless device comprises at least one of a t310 expiry, a random access problem (e.g. failure), a radio link control (RLC) maximum number of retransmissions, t312 expiry, and/or the like. In an example the RLF cause may comprise at least one of the first information element (IE) indicating the connection failure is caused by the beam failure recovery request failure, and/or the second information element (IE) indicating the connection failure is based on the expiration of the beam failure recovery timer.

In an example, the first IE may indicate that the connection failure is determined in response to determining the beam failure recovery request failure. The first IE may indicate a beam failure recovery request failure. In an example, the first IE may indicate that a connection failure was determined after the time duration of the connection failure timer (e.g. T310 or other type of timer). The connection failure timer may start before the beam failure recovery request failure (e.g. when receiving one or more out-of-sync indication, or when receiving a beam failure indication from a lower layer), or may start in response to the beam failure recovery request failure.

In an example, the second IE may indicate that the connection failure is based on the expiration of the beam failure recovery timer. The expiration may cause the determination of the beam failure recovery request failure. The second IE may indicate a beam failure recovery timer expiry.

In an example, the t310 expiry may indicate that a timer t310 of the wireless device expired at the failed cell when the connection failure occurred. The timer t310 may start when the wireless device detects physical layer related problems (e.g. for a primary cell) (e.g. when the wireless device receives a certain number (e.g. N310) consecutive out-of-sync indications from lower layers). In an example, the timer t310 may stop: when the wireless device receives a certain number (e.g. N311) consecutive in-sync indications from lower layers (e.g. for a primary cell); upon triggering a handover procedure; upon initiating an RRC connection reestablishment procedure; and/or the like. In an example, at an expiry of the timer t310, if security is not activated, the wireless device may go to an RRC idle state. In an example, at an expiry of the timer t310, if security is activated, the wireless device may initiate an RRC connection reestablishment procedure.

In an example, the t312 expiry may indicate that a timer t312 of the wireless device expired at the failed cell when the connection failure occurred. The timer t312 may start upon triggering a measurement report for a measurement identity for which the timer t312 has been configured, while the timer t310 is running. In an example, the timer t312 may stop: upon receiving a certain number (e.g. N311) of consecutive in-sync indications from lower layers; upon triggering a handover procedure; upon initiating a connection re-establishment procedure; upon an expiry of the timer t310; and/or the like. In an example, at an expiry of the timer t312, if security is not activated, the wireless device may go to an idle state. In an example, at an expiry of the timer t312, if security is activated, the wireless device may initiate an RRC connection reestablishment procedure.

In an example, the random access problem (e.g. failure) may indicate that the wireless device experienced one or more random access problems (e.g. random access failures) at the failed cell when the connection failure occurred. In an example, the RLC maximum number of retransmissions may indicate that an RLC layer of the wireless device tried a maximum number of packet retransmissions when connection failure occurred.

In an example, the wireless device identifier of the wireless device may comprise a C-RNTI at the failed cell (e.g. at the first cell), a temporary mobile subscriber identity (TMSI), an International Mobile Subscriber Identity (IMSI), Globally Unique Temporary Identifier (GUTI), and/or the like. In an example, the carrier frequency value may indicate a carrier frequency value of the failed cell. In an example, the carrier frequency value may comprise at least one of an EARFCN, an ARFCN, and/or the like, for example with a maximum value of a maxEARFCN. In an example, the carrier frequency value may be determined according to a band used when obtaining a concerned measurement results.

In an example, the measurement result may comprise at least one of a reference signal received power result (RSRP) or a reference signal received quality (RSRQ) of at least one of the failed cell, a last serving cell, one or more serving cells, one or more neighboring cells of the failed cell, one or more secondary cells of the wireless device when the failed cell was a primary cell, and/or the like. In an example, the wireless device may determine one or more elements of the measurement result by measuring when (or before/after) the wireless device experiences the connection failure. In an example, the quality classification indication 1 bearer (e.g. drb-EstablishedWithQCI-1) may indicate that the connection failure occurred while a bearer with QCI value 1 was configured.

Figure 18:
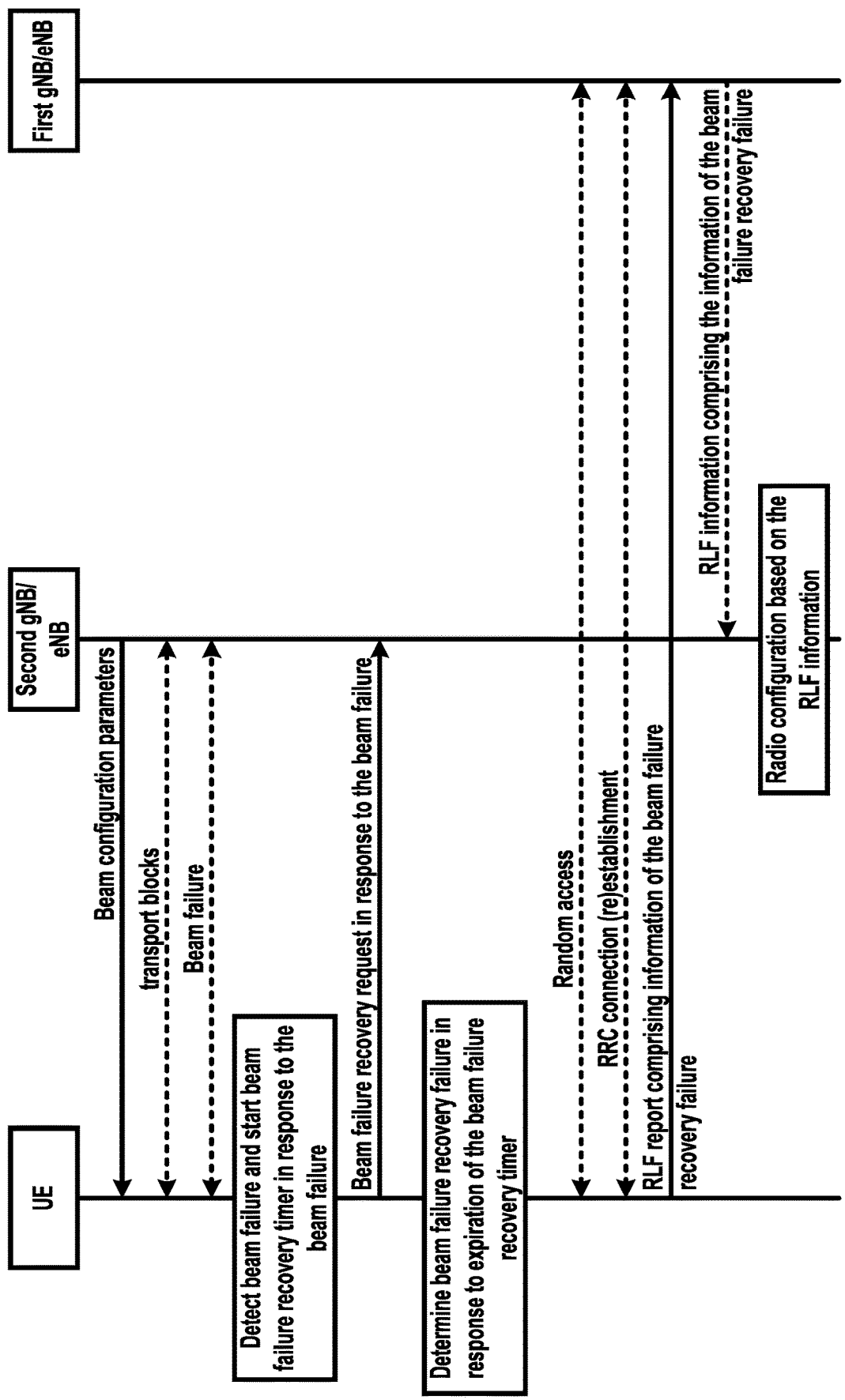
FIG. 18 is an example diagram of an aspect of an embodiment of the present disclosure.
Figure 19:
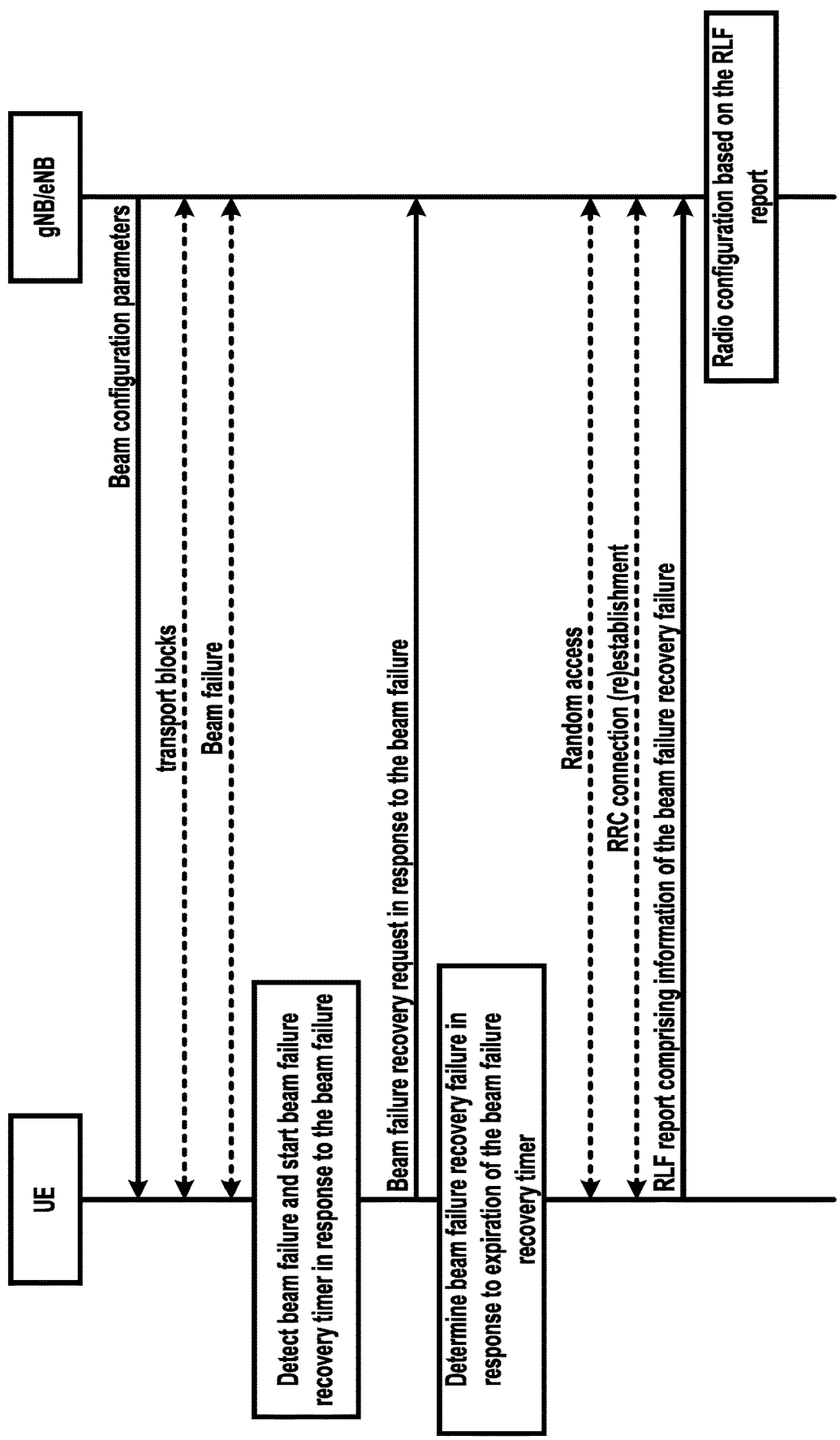
FIG. 19 is an example diagram of an aspect of an embodiment of the present disclosure.
Figure 20:
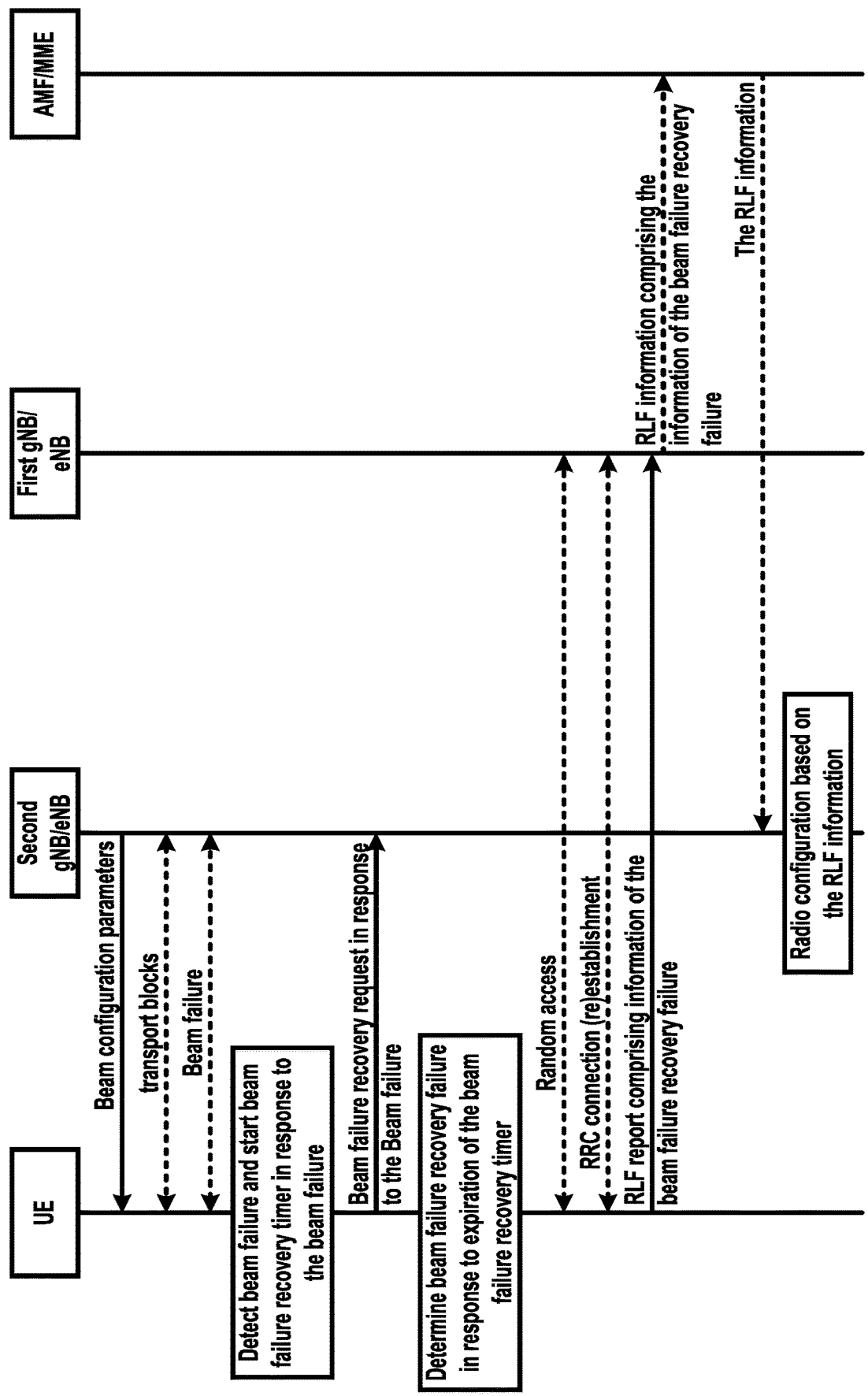
FIG. 20 is an example diagram of an aspect of an embodiment of the present disclosure.

In an example, as shown in FIG. 18, FIG. 19, and/or FIG. 21, the base station (e.g. serving the first cell) may receive, from the first base station, the RLF report and/or one or more elements (e.g. the RLF cause and/or the beam configuration parameters) of the RLF report via an Xn interface, via an X2 interface, via an Xx interface, and/or the like (e.g. a direct interface between the base station and the first base station). In an example, as shown in FIG. 20, the base station may receive, from the first base station, the RLF report and/or the one or more elements (e.g. the RLF cause and/or the beam configuration parameters) of the RLF report via one or more core network entities (e.g. one or more AMFs, one or more MMEs, one or more SGSNs, one or more GGSNs, and/or the like), employing logical direct interfaces between the base station and the one or more core network entities and/or between the first base station and the one or more core network entities (e.g. an NG interface, an N2 interface, an S1 interface, and/or the like). In an example, as shown in FIG. 17 and/or FIG. 19, if the base station is the first base station, the base station may receive the RLF report via the first message (directly) from the wireless device.

In an example, the first base station may determine at least one cell configuration parameter of one or more cells of the first base station for one or more wireless devices based on the RLF report. The one or more cells may comprise the failed cell (e.g. the first cell) of the wireless device. In an example, the at least one cell configuration parameter may comprise at least one of: at least one beam configuration parameters; at least one transmission power configuration parameter; at least one frequency configuration parameter; at least one beamforming configuration parameter; at least one physical control channel scheduling parameter; at least one antenna configuration parameter; at least one cell selection or reselection configuration parameter for one or more wireless devices; at least one system information; at least one interference control parameter; and/or the like.

In an example, the at least one beam configuration parameters may be for one or more wireless devices. The at least one beam configuration parameters may comprise one or more parameters indicating at least one of: a plurality of beam indexes of a plurality of beams; a plurality of SSB beam configurations; a plurality of CSI-RS beam configurations; a plurality of beam directions of a plurality of beams; a subcarrier spacing for a plurality of beams; a cyclic prefix; a number of contiguous PRBs; an index in the set of one or more DL beams and/or one or more UL beams; a link between a DL beam and an UL beam from a set of configured DL beams and UL beams; a DCI detection to a PDSCH reception timing value; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth; and/or the like.

The at least one beam configuration parameters may comprise one or more parameters indication at least one of CSI-RS beam indexes, SS beam indexes, BRACH resource configurations, BRACH preamble configuration parameters, beam based SRS transmission configuration information, beam based CSI-RS configuration parameters, beam based SS configuration parameters, beam failure recovery timer, number of random access preamble transmission repetitions, beam measurement configuration parameters, beam failure detection RS resource configuration information (e.g. Beam-Failure-Detection-RS-ResourceConfig), candidate beam RS list (e.g. Candidate-Beam-RS-List) for radio link quality measurements on the serving cell, beam failure candidate beam received power threshold (e.g. Beam-failure-candidate-beam-threshold), control resource set (CORESET) information for beam failure recovery response (e.g. Beam-failure-Recovery-Response-CORESET), RACH resource for beam failure recovery procedure (e.g. Beam-failure-recovery-request-RACH-Resource), time window information for beam failure recovery request (e.g. Beam-failure-recovery-request-window), TCI-StatesPDCCH, and/or the like.

In an example, if a wireless device experiences a connection failure during a time that a first beam of a plurality of beams of a cell is employed, a base station may reconfigure uplink/downlink transmission power for the first beam for one or more wireless devices.

In an example, if a channel quality (e.g. RSRP, RSRQ) of a second beam of a plurality of beams of a cell is good (e.g. better than a channel quality of an active BWP) when a wireless device experiences a connection failure during a time that a first beam is employed, a base station may make one or more wireless devices to employ the second beam when measurement results of the one or more wireless device are similar to measurement results of the wireless device at the connection failure.

In an example, the at least one transmission power configuration parameter may comprise a maximum downlink/uplink cell transmission power, a physical downlink control channel (PDCCH) transmission power, one or more power control parameters for uplink and/or downlink, a TPC configuration parameter, an SRS configuration parameter, and/or the like for one or more wireless device and/or for the first base station. In an example, if the base station determines that the connection failure occurred because of a low transmission power of a PDCCH (e.g. based on the measurement result of the RLF report), the first base station may increase a transmission power of the PDCCH. In an example, if the connection failure occurred because of large interferences on a PDCCH, the first base station may reschedule the PDCCH to be located at other subframes.

In an example, if a wireless device experiences a connection failure during a time that a first beam is employed, a base station may increase an uplink/downlink power level (e.g. 0.1 dB increase) for one or more wireless devices (e.g. UEs served in the first cell) when the one or more wireless devices employ the first beam.

In an example, if a cause of a connection failure of a wireless device is a random access problem and the wireless device experiences the connection failure during a time that a first beam is employed, a base station may not configure the first beam for a random access preamble transmission of one or more wireless devices.

In an example, if a cause of a connection failure of a wireless device is an RLC maximum number of retransmissions (e.g. uplink transmission problem; a number of RLC retransmissions is over a threshold value) and the wireless device experiences the connection failure during a time that a first beam is employed, a base station may increase an uplink power level for one or more wireless devices when the one or more wireless devices employ the first beam.

In an example, the at least one frequency configuration parameter may comprise a carrier frequency, a bandwidth, one or more bandwidth part configuration parameters, and/or the like. In an example, if a cell of the base station experiences large interferences from neighboring cells, the base station may change an operation frequency to other frequency. In an example, if a certain beam of a served cell of the base station experiences large interferences from neighboring cells or other technologies, the base station may make one or more wireless devices to employ a beam other than the certain beam when measurement results of the one or more wireless devices are similar to measurement results of the wireless device at the connection failure.

In an example, the at least one beamforming configuration parameter may comprise one or more beamforming direction configuration parameters, one or more beam sweeping configuration parameters, one or more synchronization signal (SS)/reference signal (e.g. CSI-RS) configuration parameters, one or more beam recovery related parameters, one or more BRACH parameter, one or more preamble configuration parameters for beam recovery, one or more random access configuration parameters of one or more beams, and/or the like. In an example, if the connection failure occurred because of a random access failure or a failure of beam recovery procedure (e.g. out-of-sync), the base station may reschedule random access resources and/or BRACH resources, and/or may reconfigure preambles to reduce random access contentions.

In an example, the at least one physical control channel scheduling parameter may comprise a subframe pattern configuration parameter, a measurement subframe pattern configuration parameter, a transmission type parameter indicating a localized transmission and/or distributed transmission, a resource block assignment configuration parameter, a CSI-RS configuration parameter, and/or the like. In an example, the at least one antenna configuration parameter may comprise default antenna configuration parameters, an antenna port configuration parameter, a number of CRS antenna port parameter, and/or the like. In an example, the at least one cell selection or reselection configuration parameter for one or more wireless devices may comprise one or more power/time threshold parameters for cell selection/reselection of at least one wireless device of the base station, one or more cell priority configuration parameters for cell selection/reselection, and/or the like. In an example, the connection failure occurred because of a random access failure of the wireless device, the base station may increase values of the one or more power/time threshold parameters to make wireless devices avoid the failed cell if the wireless devices do not satisfy increased thresholds.

In an example, the base station may reconfigure one or more IEs of the at least one system information comprising at least one of system information type block type 1 to 21 based on the RLF report. In an example, the at least one interference control parameter may comprise one or more almost blank subframe configuration parameters, one or more CoMP interference management related parameters, and/or the like. In an example, if the connection failure occurred because of interferences from a neighboring cell of the failed cell, the base station may schedule resource blocks for the neighboring cell and the failed cell not to use the resource blocks simultaneously.

In an example, the base station may transmit at least one system information blocks comprising the at least one cell configuration parameter. The at least one system information blocks may be at least one of the system information block type 1 to 21. The base station may transmit at least one of the at least one cell configuration parameter to one or more wireless devices, e.g. via an RRC message. The one or more wireless device may comprise the wireless device.

EXAMPLES

Figure 22:
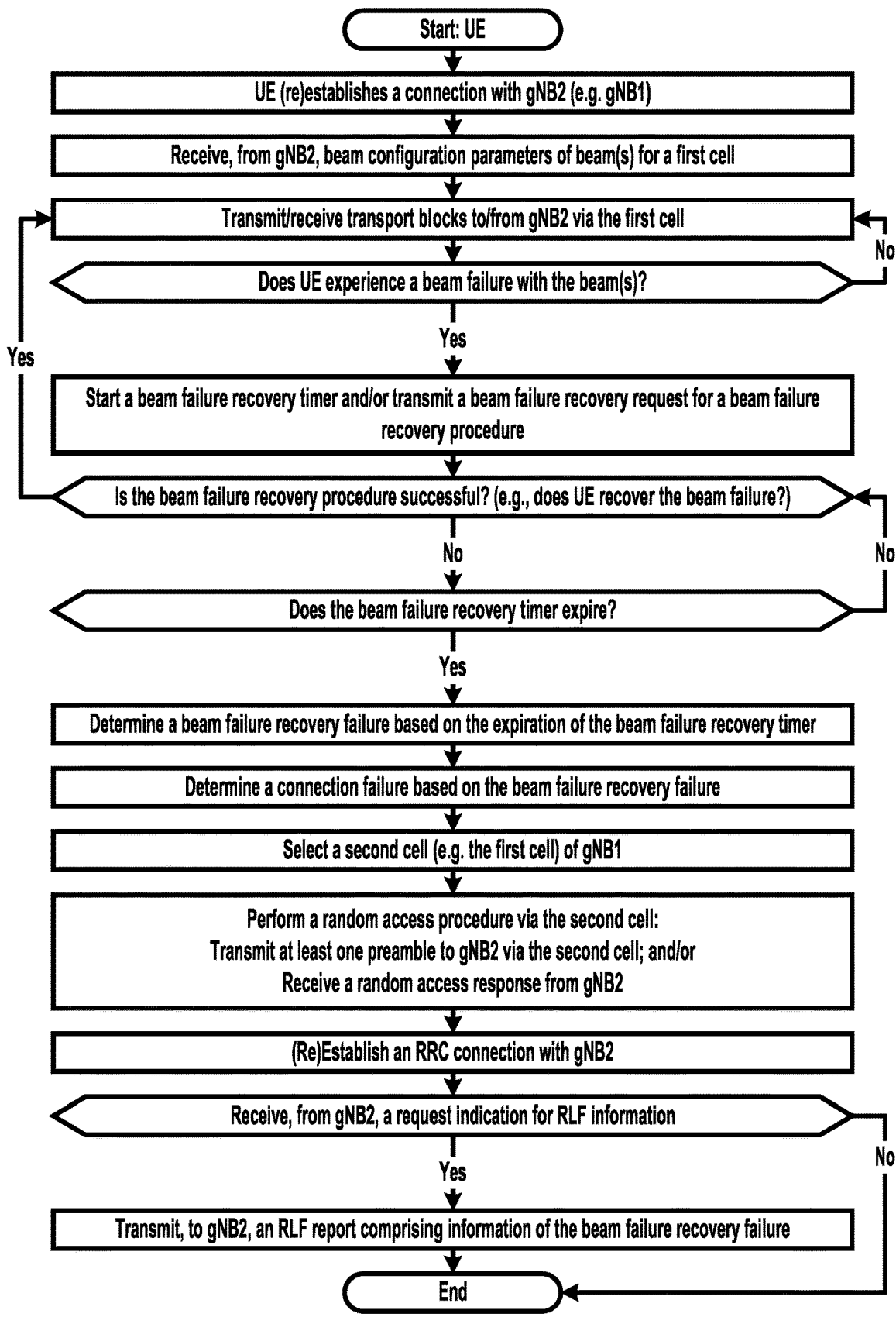
FIG. 22 is an example diagram of an aspect of an embodiment of the present disclosure.

In an example, as shown in FIG. 22, a wireless device may detect a beam failure on one or more first beams of a first cell. In response to detecting the beam failure, the wireless device may start a beam failure recovery timer, and/or transmit a random access preamble. The wireless device may determine a beam failure recovery request failure in response to expiration of the beam failure recovery timer. The wireless device may transmit, to a first base station, a first message comprising a radio link failure report associated with the beam failure recovery request failure. The radio link failure report may comprise at least one of a first information element indicating that a connection failure is caused by the beam failure recovery request failure and/or a second information element indicating that the connection failure is based on the expiration of the beam failure recovery timer.

Figure 23:
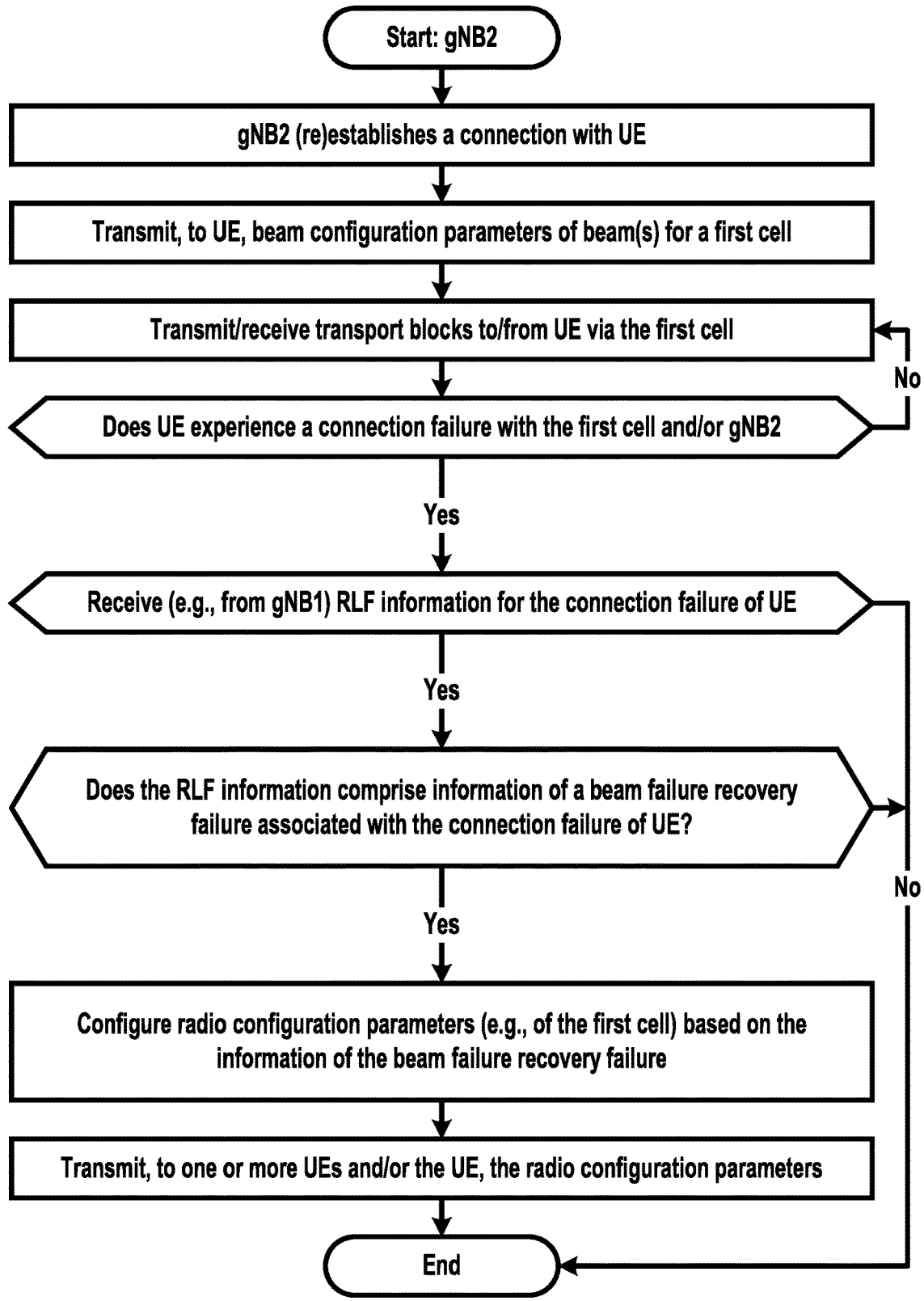
FIG. 23 is an example diagram of an aspect of an embodiment of the present disclosure.
Figure 24:
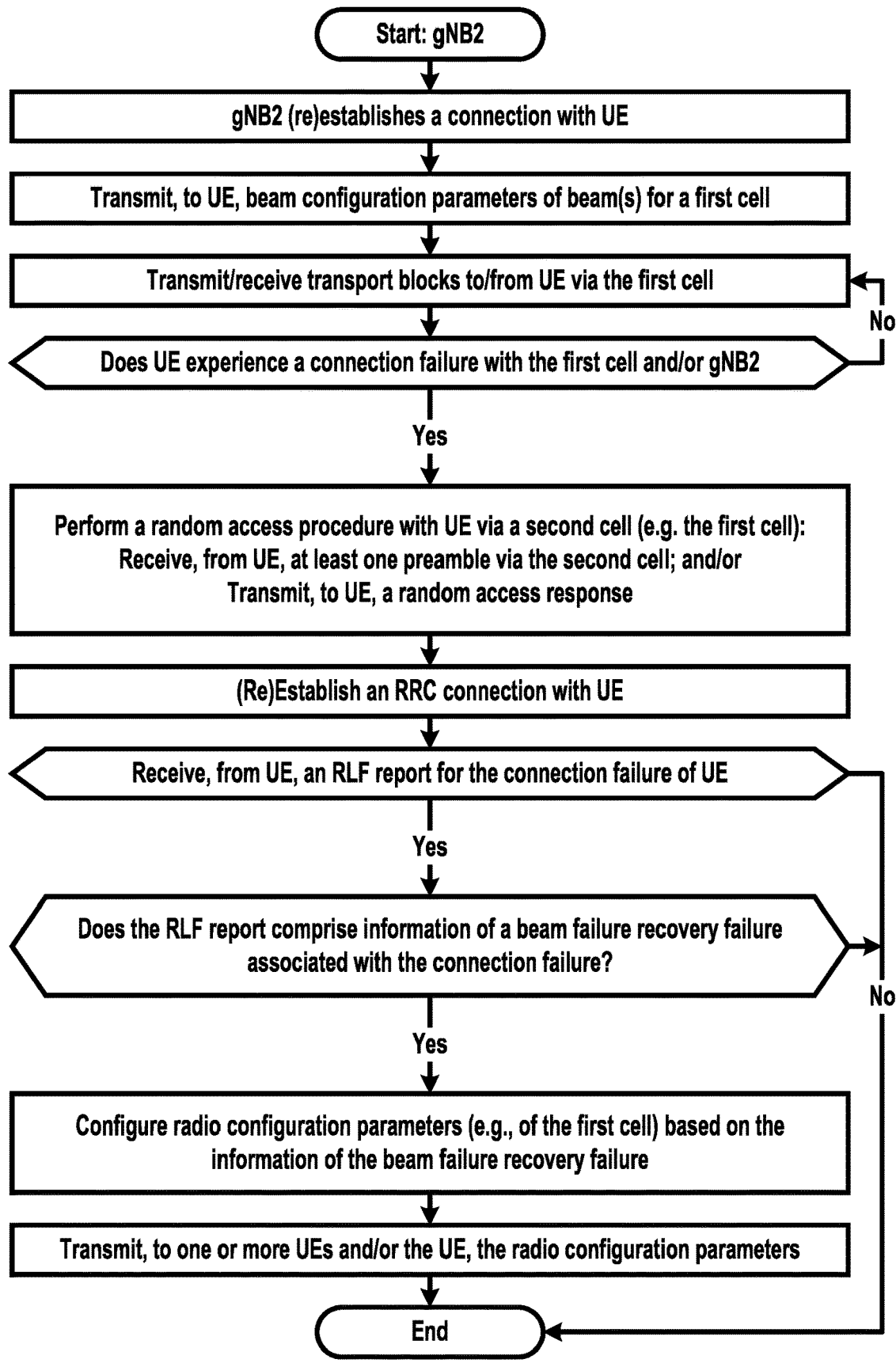
FIG. 24 is an example diagram of an aspect of an embodiment of the present disclosure.
Figure 25:
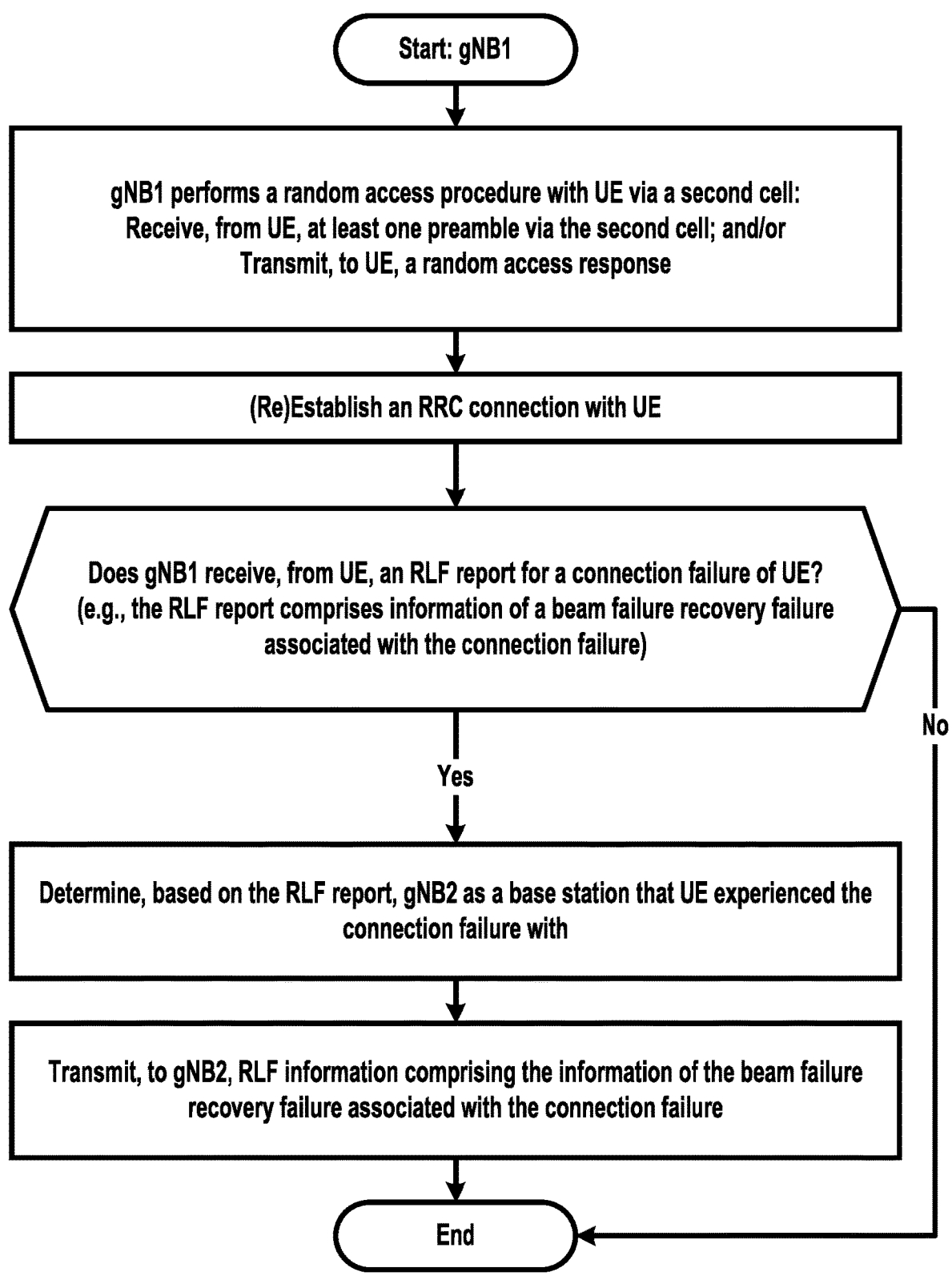
FIG. 25 is an example diagram of an aspect of an embodiment of the present disclosure.

In an example, the one or more first beams may comprise at least one of a synchronization signal block beam and/or a channel state information-reference signal beam. The wireless device may transmit the random access preamble via a beam random access resource associated with at least one of a synchronization signal block with a reference signal received power above a first power value (e.g. rsrp-ThresholdSSB) and/or a channel state information-reference signal with a reference signal received power above a second power value (e.g. csirs-dedicatedRACH-Threshold). In an example, the radio link failure report may further indicate at least one of a cell identifier of the first cell and/or one or more first beam indexes of the one or more first beams. The base station of the first cell may determine one or more cell configuration parameters of the first cell based on the radio link failure report. In an example, as shown in FIG. 23 and/or FIG. 25, the base station of the first cell may receive, from the first base station, the radio link failure report. In an example, as shown in FIG. 24, the base station of the first cell may be the first base station. The base station may determine one or more cell configuration parameters of the first cell based on the radio link failure report.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 26:
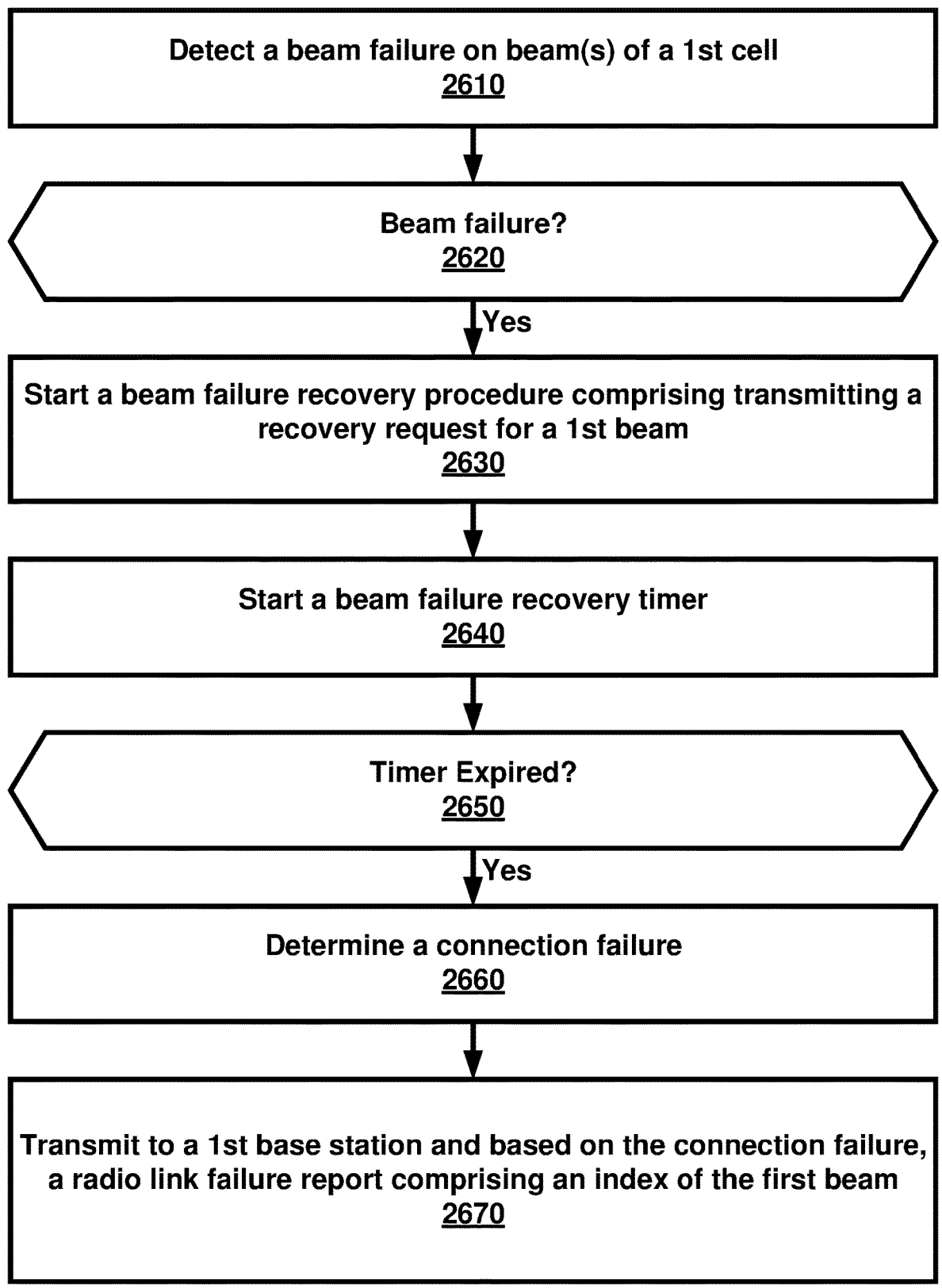
FIG. 26 is an example diagram of an aspect of an embodiment of the present disclosure.

FIG. 26 is an example flow diagram as per an aspect of an embodiment of the present disclosure. At 2610, a wireless device may detect a beam failure on at least one beam. The at least one beam may be of a first cell. At 2630, a beam failure recovery procedure may be started in response to the beam failure (2620). The beam failure recovery procedure may comprise transmitting a recovery request for a first beam. At 2640, a beam failure recovery timer for the beam failure recovery procedure may be started. At 2660, the wireless device may determine a connection failure based on expiration of the beam failure recovery timer (2650). At 2670, the wireless device may transmit a radio link failure report to a first base station based on the connection failure. The radio link failure report may comprise an index of the first beam.

According to an example embodiment, the wireless device may receive a radio resource control message. The radio resource control message may comprise a random access preamble for the first beam. The transmitting of the recovery request may comprise transmitting the random access preamble. According to an example embodiment, the radio resource control message may comprise at least one configuration parameter of a reference signal for the first beam.

According to an example embodiment, the expiration of the beam failure recovery timer may indicate a failure of the beam failure recovery procedure. According to an example embodiment, the radio link failure report may comprise a time value for the beam failure recovery timer.

According to an example embodiment, the radio link failure report may comprise a random access resource configuration parameter for the recovery request. According to an example embodiment, the radio link failure report may comprise a random access preamble configuration parameter for the recovery request. According to an example embodiment, the radio link failure report may comprise a number of random access preamble transmission repetitions. According to an example embodiment, the radio link failure report may comprise control resource set information for a beam failure recovery response. According to an example embodiment, the radio link failure report further may comprise at least one beam index of the at least one beam of the first cell. According to an example embodiment, the radio link failure report further may comprise a beam index of a candidate beam. According to an example embodiment, the radio link failure report further may comprise a received power value for a candidate beam for the beam failure recovery procedure.

According to an example embodiment, the wireless device may receive beam configuration parameters. The radio link failure report may comprise the beam configuration parameters. According to an example embodiment, the at least one beam may comprise a synchronization signal block beam. According to an example embodiment, the at least one beam may comprise a channel state information-reference signal beam.

According to an example embodiment, the wireless device may transmit the recovery request of the beam failure recovery procedure via a random access resource for a synchronization signal block with a reference signal received power being equal to or larger than a first power value. According to an example embodiment, the wireless device may transmit the recovery request of the beam failure recovery procedure via a random access resource for a channel state information-reference signal with a reference signal received power being equal to or larger than a second power value.

According to an example embodiment, the radio link failure report may comprises a field indicating that a failure of the beam failure recovery procedure is a cause of the connection failure. According to an example embodiment, the radio link failure report further comprises a field indicating that the expiration of the beam failure recovery timer is a cause of the connection failure. According to an example embodiment, the radio link failure report may comprise a cell identifier of the first cell. According to an example embodiment, the radio link failure report may comprise at least one beam index of the at least one beam. According to an example embodiment, the radio link failure report may comprise an identifier of the wireless device at the first cell. According to an example embodiment, the radio link failure report may comprise a field indicating a carrier frequency of the first cell. According to an example embodiment, the radio link failure report may comprise a time value indicating a time duration that elapsed since a last handover initialization for the wireless device until the connection failure. According to an example embodiment, the radio link failure report may comprise a time value indicating a time duration that elapsed since the connection failure. According to an example embodiment, the radio link failure report may comprise a reference signal received power value of the first cell. According to an example embodiment, the radio link failure report may comprise a reference signal received quality value of the first cell.

According to an example embodiment, a second base station serving the first cell from the first base station, may receive at least a part of the radio link failure report. According to an example embodiment, the second base station may determine, based on the at least a part of the radio link failure report, configuration parameters of the first cell. According to an example embodiment, the second base station may transmit the configuration parameters to one or more wireless devices. According to an example embodiment, the configuration parameters may comprise beam configuration parameters. According to an example embodiment, the second base station may receive at least a part of the radio link failure report from the first base station via at least one core network node.

According to an example embodiment, the first base station may serve the first cell. According to an example embodiment, the wireless device may select, based on the determining the connection failure, a second cell. According to an example embodiment, the first base station may transmit a preamble for a random access to the second cell of the first base station. According to an example embodiment, a random access response may be received in response to the preamble for the random access. According to an example embodiment, the first cell may be the second cell. According to an example embodiment, the configuration parameters of the first cell may be based on at least a part of the radio link failure report. According to an example embodiment, the first cell may be a primary cell of the wireless device. According to an example embodiment, the wireless device may transmit to the first base station, a radio resource control message indicating the connection failure. According to an example embodiment, an information request message for information of the connection failure may be received. According to an example embodiment, the transmitting of the radio link failure report may be based on the information request message.

Figure 27:
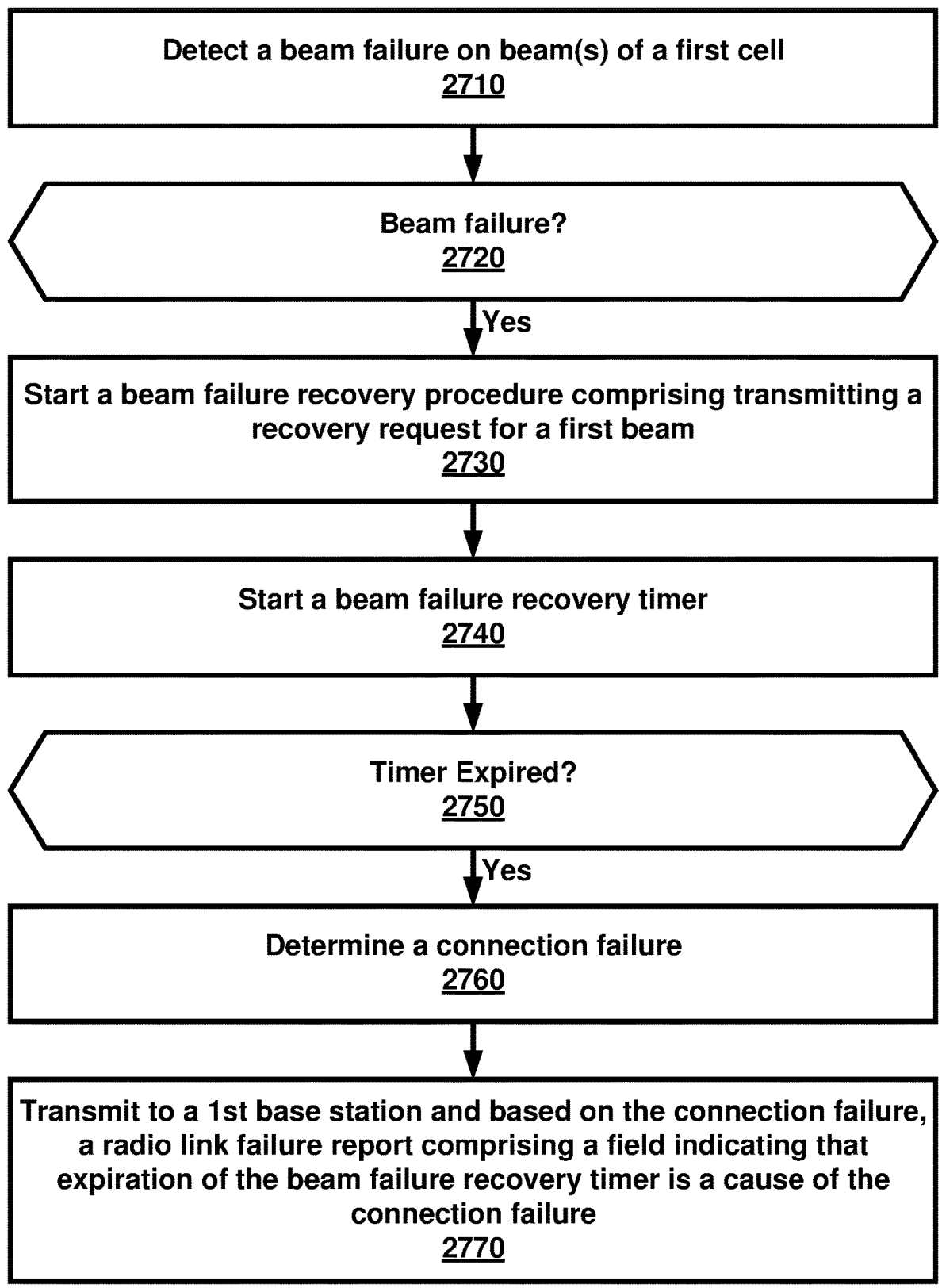
FIG. 27 is an example diagram of an aspect of an embodiment of the present disclosure.

FIG. 27 is an example flow diagram as per an aspect of an embodiment of the present disclosure. At 2710, a wireless device may detect a beam failure on at least one beam. The at least one beam may be of a first cell. At 2730, a beam failure recovery procedure may be started in response to the beam failure (2720). The beam failure recovery procedure may comprise transmitting a recovery request for a first beam. At 2740, a beam failure recovery timer for the beam failure recovery procedure may be started. At 2760, the wireless device may determine a connection failure based on expiration of the beam failure recovery timer (2750). At 2770, the wireless device may transmit a radio link failure report to a first base station based on the connection failure. The radio link failure report may comprise a field indicating that the expiration of the beam failure recovery timer is a cause of the connection failure.

Figure 28:
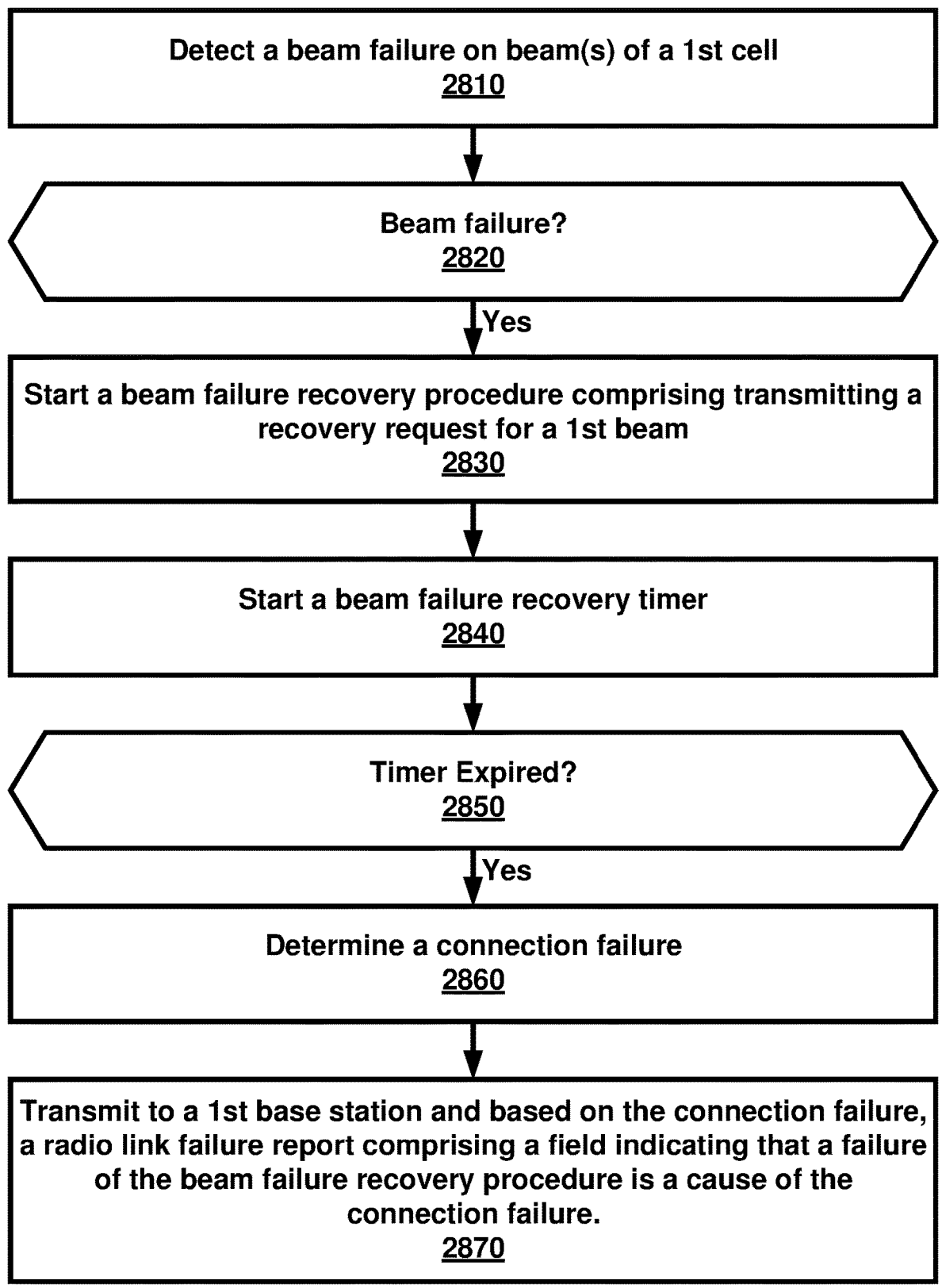
FIG. 28 is an example diagram of an aspect of an embodiment of the present disclosure.

FIG. 28 is an example flow diagram as per an aspect of an embodiment of the present disclosure. At 2810, a wireless device may detect a beam failure on at least one beam. The at least one beam may be of a first cell. At 2830, a beam failure recovery procedure may be started in response to the beam failure (2820). The beam failure recovery procedure may comprise transmitting a recovery request for a first beam. At 2840, a beam failure recovery timer for the beam failure recovery procedure may be started. At 2860, the wireless device may determine a connection failure based on expiration of the beam failure recovery timer (2850). At 2870, the wireless device may transmit a radio link failure report to a first base station based on the connection failure. The radio link failure report may comprise a field indicating that a failure of the beam failure recovery procedure is a cause of the connection failure. According to an example embodiment, the wireless device may determine, response to the expiration of the beam failure recovery timer, the failure of the beam failure recovery procedure.

Figure 29:
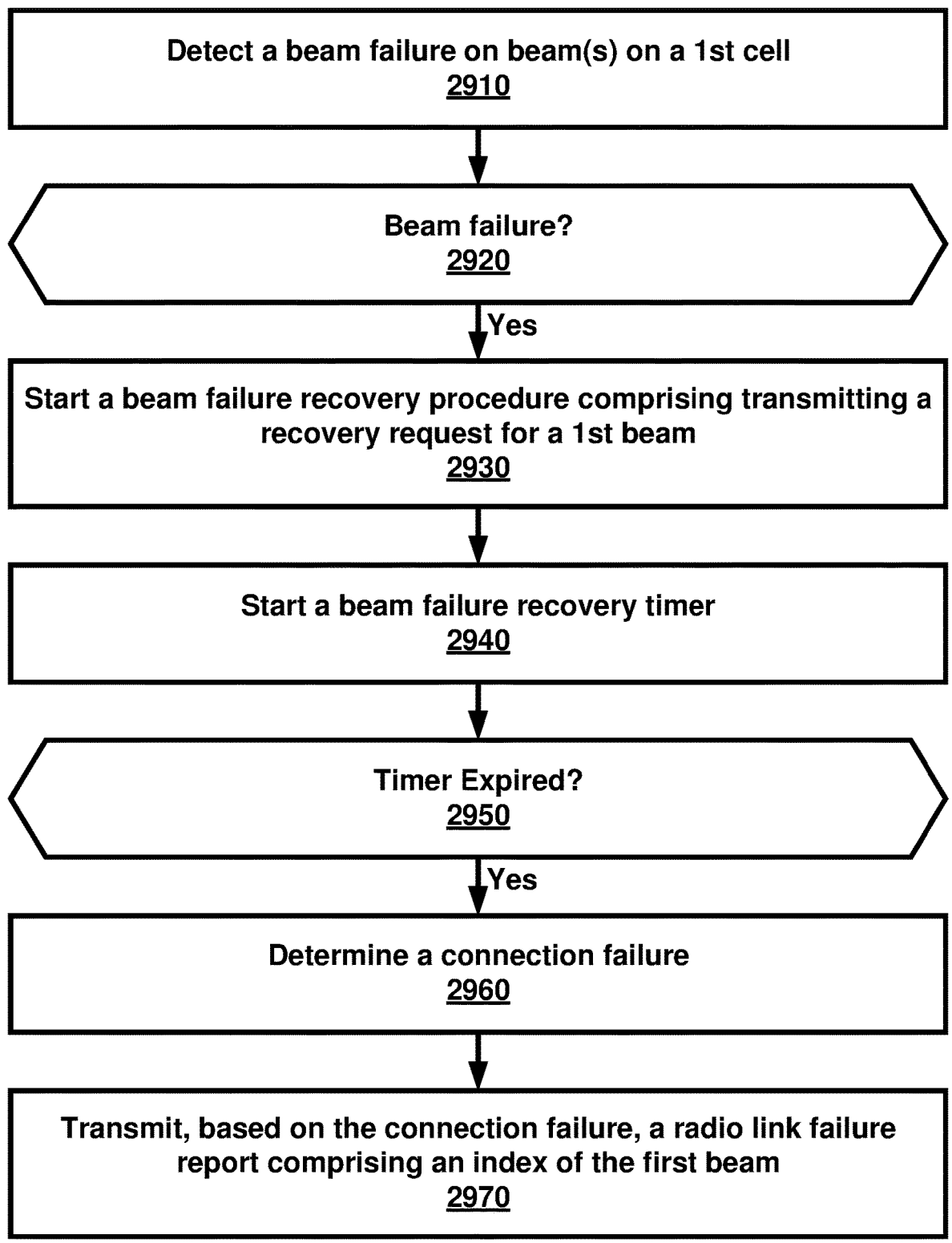
FIG. 29 is an example diagram of an aspect of an embodiment of the present disclosure.

FIG. 29 is an example flow diagram as per an aspect of an embodiment of the present disclosure. At 2910, a wireless device may detect a beam failure on a first cell. At 2930, a beam failure recovery procedure may be started in response to the beam failure (2920). The beam failure recovery procedure may comprise transmitting a recovery request for a first beam. At 2940, a beam failure recovery timer for the beam failure recovery procedure may be started. At 2960, the wireless device may determine a connection failure based on expiration of the beam failure recovery timer (2950). At 2970, the wireless device may transmit, based on the connection failure, a radio link failure report. The radio link failure report may comprise an index of the first beam.

Figure 30:
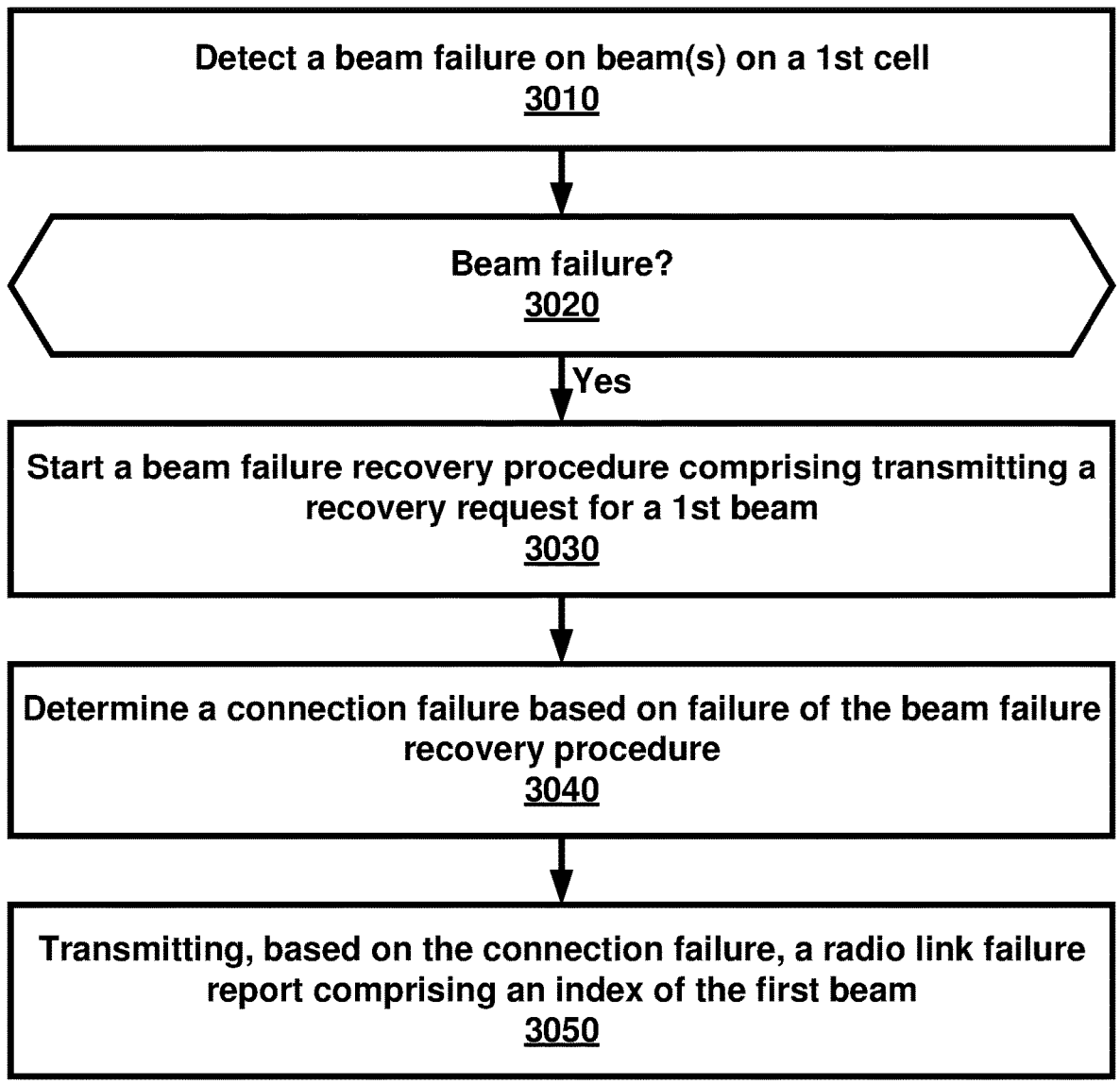
FIG. 30 is an example diagram of an aspect of an embodiment of the present disclosure.

FIG. 30 is an example flow diagram as per an aspect of an embodiment of the present disclosure. At 3010, a wireless device may detect a beam failure on a first cell. At 3030, a beam failure recovery procedure may be started in response to the beam failure (3020). The beam failure recovery procedure may comprise transmitting a recovery request for a first beam. At 3040, a connection failure may be determined, based on failure of the beam failure recovery procedure. At 3050, the wireless device may transmit, based on the connection failure, a radio link failure report. The radio link failure report may comprise an index of the first beam.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    initiating, by a wireless device, a beam failure recovery procedure based on a beam failure of at least one beam of a cell;
    determining a radio link failure based on a failure of the beam failure recovery procedure; and
    transmitting a radio link failure report comprising:
        a first field indicating that the failure of the beam failure recovery procedure is a cause of the radio link failure; and
        a second field indicating a random access resource for the beam failure recovery procedure.

2. The method of claim 1, further comprising receiving a radio resource control message comprising one or more beam configuration parameters of the at least one beam of the cell.

3. The method of claim 2, wherein:
    the radio resource control message indicates a random access preamble for the beam failure recovery procedure; and
    the beam failure recovery procedure comprises transmitting the random access preamble for a recovery request.

4. The method of claim 2, wherein the radio link failure report comprises the one or more beam configuration parameters of the at least one beam of the cell.

5. The method of claim 1, wherein the radio link failure report comprises at least one of:
    control resource set information for the beam failure recovery procedure; or
    a number of random access preamble transmissions associated with the beam failure recovery procedure.

6. The method of claim 1, wherein the radio link failure report indicates at least one of:
    a cell identifier of the cell;
    at least one beam index of the at least one beam of the cell;
    a beam index of a candidate beam for the beam failure recovery procedure; or
    a received power for the candidate beam for the beam failure recovery procedure.

7. The method of claim 1, wherein the at least one beam comprises at least one of:
    a synchronization signal block beam; or
    a channel state information-reference signal beam.

8. The method of claim 1, further comprising:
    selecting, by the wireless device and based on the determining the radio link failure, a second cell of a first base station;
    transmitting, to the first base station, a preamble for a random access to the second cell of the first base station; and
    receiving a random access response in response to the preamble for the random access.

9. A wireless device comprising:
    one or more processors; and
    memory storing instructions that, when executed by the one or more processors, cause the wireless device to:
        initiate a beam failure recovery procedure based on a beam failure of at least one beam of a cell;
        determine a radio link failure based on a failure of the beam failure recovery procedure; and
        transmit a radio link failure report comprising:
            a first field indicating that the failure of the beam failure recovery procedure is a cause of the radio link failure; and
            a second field indicating a random access resource for the beam failure recovery procedure.

10. The wireless device of claim 9, wherein the instructions, when executed by the one or more processors, further cause the wireless device to receive a radio resource control message comprising one or more beam configuration parameters of the at least one beam of the cell.

11. The wireless device of claim 10, wherein:
    the radio resource control message indicates a random access preamble for the beam failure recovery procedure; and
    the beam failure recovery procedure comprises transmitting the random access preamble for a recovery request.

12. The wireless device of claim 10, wherein the radio link failure report comprises the one or more beam configuration parameters of the at least one beam of the cell.

13. The wireless device of claim 9, wherein the radio link failure report comprises at least one of:
    control resource set information for the beam failure recovery procedure; or
    a number of random access preamble transmissions associated with the beam failure recovery procedure.

14. The wireless device of claim 9, wherein the radio link failure report indicates at least one of:
    a cell identifier of the cell;
    at least one beam index of the at least one beam of the cell;
    a beam index of a candidate beam for the beam failure recovery procedure; or
    a received power for the candidate beam for the beam failure recovery procedure.

15. The wireless device of claim 9, wherein the at least one beam comprises at least one of:
- a synchronization signal block beam; or
- a channel state information-reference signal beam.

16. The wireless device of claim 9, wherein the instructions, when executed by the one or more processors, further cause the wireless device to:
- select, based on the wireless device determining the radio link failure, a second cell of a first base station;
- transmit, to the first base station, a preamble for a random access to the second cell of the first base station; and
- receive a random access response in response to the preamble for the random access.

17. A first base station comprising:
- one or more processors; and
- memory storing instructions that, when executed by the one or more processors, cause the first base station to:
  - receive a radio link failure report comprising:
    - a first field indicating that a failure of a beam failure recovery procedure is a cause of a radio link failure; and
    - a second field indicating a random access resource for the beam failure recovery procedure.

18. The first base station of claim 17, wherein the instructions, when executed by the one or more processors, further cause the first base station to:
- receive, from a second base station, a part of the radio link failure report;
- determine, based on the part of the radio link failure report, configuration parameters of a cell on which a beam failure occurred; and
- transmit, to one or more wireless devices, the configuration parameters.

19. The first base station of claim 17, wherein the instructions, when executed by the one or more processors, further cause the first base station to transmit a radio resource control message comprising one or more beam configuration parameters of at least one beam of a cell for which the beam failure recovery procedure is performed.

20. The first base station of claim 19, wherein:
- the radio resource control message indicates a random access preamble for the beam failure recovery procedure; and
- the beam failure recovery procedure comprises receiving the random access preamble for a recovery request.

* * * * *